(12) United States Patent
He et al.

(10) Patent No.: US 11,067,225 B2
(45) Date of Patent: Jul. 20, 2021

(54) SINGLE-HAND-LEVER DOUBLE-JOINT-CONTROL ADJUSTABLE HOOP TYPE BEARING FRAME

(71) Applicant: Tianjin Botai Tianyu Science and Technology Development Company Limited, Tianjin (CN)

(72) Inventors: Shengbin He, Tianjin (CN); Weiping Cao, Tianjin (CN)

( * ) Notice: Subject to any disclaimer, the term of this patent is extended or adjusted under 35 U.S.C. 154(b) by 139 days.

(21) Appl. No.: 16/504,337

(22) Filed: Jul. 8, 2019

(65) Prior Publication Data

US 2021/0010637 A1 Jan. 14, 2021

(51) Int. Cl.
  *F16M 13/04* (2006.01)
  *G03B 17/56* (2021.01)
  *F16M 11/04* (2006.01)
  *F16M 11/34* (2006.01)

(52) U.S. Cl.
  CPC ............ *F16M 13/04* (2013.01); *F16M 11/04* (2013.01); *F16M 11/34* (2013.01); *G03B 17/561* (2013.01)

(58) Field of Classification Search
  CPC ........ F16M 11/32; F16M 11/34; F16M 11/16; F16M 13/04; G03B 17/561
  USPC ...... 248/170, 173, 177.1, 166, 188.5, 188.6, 248/168
  See application file for complete search history.

(56) References Cited

U.S. PATENT DOCUMENTS

| | | | | |
|---|---|---|---|---|
| 3,963,207 A | * | 6/1976 | Guasti | F16M 11/16 248/168 |
| 4,570,886 A | * | 2/1986 | Mooney | F16M 11/34 248/186.1 |
| 4,767,090 A | * | 8/1988 | Hartman | F16M 11/16 24/273 |
| 5,503,357 A | * | 4/1996 | Johnson | F16M 11/16 248/169 |
| 5,887,835 A | * | 3/1999 | Hein | F16M 11/26 248/161 |
| 6,082,685 A | * | 7/2000 | Hein | F16M 11/26 248/161 |
| 6,286,795 B1 | * | 9/2001 | Johnson | F16M 11/16 248/163.1 |
| 6,631,877 B1 | * | 10/2003 | Crain | G01C 15/00 248/168 |
| 6,688,566 B1 | * | 2/2004 | Crain | G01C 15/00 248/168 |
| 6,942,187 B2 | * | 9/2005 | Blackburn | F16M 11/32 248/163.1 |

(Continued)

*Primary Examiner* — Eret C McNichols
(74) *Attorney, Agent, or Firm* — Prakash Nama; Global IP Services, PLLC

(57) ABSTRACT

The present application belongs to the technical field of camera equipment, and particularly relates to a single-hand-lever double-joint-control adjustable hoop type bearing frame. The bearing frame comprises a fixed part; the fixed part comprises a fork frame, fixed supporting rods and a sliding frame; a base is arranged above the fork frame; a first sliding part is installed on the fixed supporting rod, and can be locked or slide relative to the fixed supporting rod; the first sliding part comprises an upper locking mechanism, a lower locking mechanism and a locking control device; the locking control device can control locking or loosening of the upper locking mechanism on the fixed supporting rod; and the fixed part is provided with a magnetic latch device.

4 Claims, 24 Drawing Sheets

(56) References Cited

U.S. PATENT DOCUMENTS

| | | | | |
|---|---|---|---|---|
| 7,604,208 B2* | 10/2009 | Tacklind | ............... | F16M 11/36 |
| | | | | 248/170 |
| 7,654,494 B2* | 2/2010 | Cartoni | ................. | F16M 11/36 |
| | | | | 248/163.1 |
| 8,292,240 B2* | 10/2012 | Hein | ...................... | F16M 11/32 |
| | | | | 248/161 |
| 9,027,895 B2* | 5/2015 | Hunter | ................... | F16B 9/056 |
| | | | | 248/292.14 |
| 10,047,899 B2* | 8/2018 | Guest | .................... | F16M 11/32 |
| 10,281,081 B2* | 5/2019 | Busarow | ................ | F16M 11/28 |
| 10,400,941 B2* | 9/2019 | Brady | ..................... | F16B 2/185 |
| 2002/0153460 A1* | 10/2002 | Lindsay | ................ | F16M 11/32 |
| | | | | 248/166 |
| 2003/0150966 A1* | 8/2003 | Lindsay | ................ | F16M 11/16 |
| | | | | 248/166 |
| 2009/0072100 A1* | 3/2009 | Zierer | ................... | F16M 11/34 |
| | | | | 248/169 |
| 2010/0064739 A1* | 3/2010 | Lu | ......................... | F16M 11/34 |
| | | | | 70/57 |
| 2011/0031358 A1* | 2/2011 | Fischer | ................ | F16M 11/36 |
| | | | | 248/168 |
| 2011/0073722 A1* | 3/2011 | Meuret | ................. | F16M 11/16 |
| | | | | 248/169 |
| 2014/0084127 A1* | 3/2014 | Lee | ......................... | H01Q 1/12 |
| | | | | 248/544 |

* cited by examiner

SINGLE-HAND-LEVER DOUBLE-JOINT-CONTROL ADJUSTABLE HOOP TYPE BEARING FRAME

BACKGROUND OF THE INVENTION

The present application belongs to the technical field of camera equipment, and particularly relates to a single-hand-lever double-joint-control adjustable hoop type bearing frame.

A camera bearing frame is a part mainly used for supporting a camera to work, and is arranged below the camera, camera bearing frames actually applied at current are in a great variety, although a structure is simple, operation is tedious, and an implementation effect is not ideal enough.

BRIEF SUMMARY OF THE INVENTION

The present application is directed to a single-hand-lever double-joint-control adjustable hoop type bearing frame, so as to solve the problem that operation is tedious in the background art.

The technical problem solved by the present application is achieved by adopting a following technical scheme:

According to the single-hand-lever double-joint-control adjustable hoop type bearing frame, the bearing frame comprises a fixed part, the fixed part comprises a fork frame, fixed supporting rods and a sliding frame, a base is arranged above the fork frame, a middle portion of a plane of the base is a conical molded surface, a side surface is provided with three shaft fixing bases, outer surfaces of the three shaft fixing bases are each in an arc shape, a shaft installing groove is arranged in the arc shape of the shaft fixing base, each of the three shaft installing grooves is internally provided with a fixed connection shaft, two ends of the three fixed connection shafts are both connected with two side lugs at a top end of the fork frame, a center bottom of the base is provided with a bowl-shaped bracket, a center of the bracket is provided with a round hole, the bracket is further provided with uniformly distributed lightening holes, the two fixed supporting rods arranged in parallel are connected with the fork frame, top ends of the two fixed supporting rods are inserted and installed at lower ends of the side lugs of the fork frame, the sliding frame is installed at bottom ends of the two fixed supporting rods, and a first sliding part and a second sliding part are further included.

The first sliding part is installed on the fixed supporting rod in a sleeving manner, and can be locked or slide relative to the fixed supporting rod, the first sliding part comprises an upper locking mechanism, a lower locking mechanism and a locking control device, and the locking control device controls locking or loosening of the upper locking mechanism on the fixed supporting rod.

The upper locking mechanism comprises upper a connection frame, a locking plate, a swing bolt and an eccentric rod, the upper connection frame is provided with a guiding and positioning hole for the fixed supporting rod to pass through, the upper connection frame is installed on the fixed supporting rod in a sleeving manner through the guiding and positioning hole, a locking plate installing groove is formed in the upper connection frame, the locking plate groove communicates with the guiding and positioning hole at a position of a groove edge, a locking plate is installed in the locking plate groove, the locking plate is provided with arc-shaped surfaces to be used for clamping the fixed supporting rod, a side face of the locking plate is connected with one end of the swing bolt, the other end of the swing bolt is installed on the eccentric rod in a sleeving manner, and movement of the eccentric rod is transmitted through the locking control device.

The locking control device comprises a pulling handle and a pulling handle core, a core body base, swinging shafts and eccentric boss shafts are arranged on the pulling handle core, the swinging shafts are arranged on two sides of the core body base, a front side of the upper connection frame is provided with a corresponding core body installing groove and swinging shaft through grooves, the swinging shaft is installed in the swinging shaft through groove, the pulling handle core is installed in the core body installing groove, the pulling handle driving the core body base to rotate is installed on a front side of the core body base, the core body base is provided with four screw holes to be connected and locked to the pulling handle through screws, the core body base rotates around a shaft axis of the swinging shaft, the swinging shaft of the pulling handle core is provided with an eccentric rod groove, the eccentric rod is installed in the eccentric rod groove, an axis of the eccentric rod deviates from an axis of the swinging shaft, and eccentric rotation of the eccentric rod enables the swing bolt to do push-pull movement.

The locking control device can control locking or loosening of the lower locking mechanism on the second sliding part, the eccentric boss shafts are arranged on two sides of the swinging shaft of the pulling handle core, an axis of the eccentric boss shaft deviates from that of the swinging shaft of the pulling handle core, the eccentric boss shaft is connected with the lower locking mechanism, the eccentric boss shaft is driven by eccentric swinging of the swinging shaft, so that the locking mechanism carries out locking or loosening on the second sliding part, the lower locking mechanism comprises outer side pipes, a connection rod, an upper pulling block, a tightening rod, a tightening wedge block, a locking block and a lower connection frame, an upper end of the outer side pipe is connected with the upper connection frame, a bottom end of the outer side pipe penetrates through the sliding frame to be connected with the lower connection frame, the connection rod is installed in the outer side pipe on one side, an upper end of the connection rod is connected with the swinging eccentric boss shaft in a hinged manner, the connection rod can be driven to achieve up-down displacement due to reciprocating swinging of the eccentric boss shaft, a lower end of the connection rod is connected with the upper pulling block in a hinged manner, the upper pulling block is in threaded connection with an upper end of the tightening rod, a bottom end of the tightening rod penetrates through the sliding frame to be provided with the tightening wedge block, the connection rod can drive the tightening wedge block to move up and down, the lower connection frame is provided with a groove, the tightening wedge block is located in the groove of the lower connection frame, the locking block is placed on one side of the tightening wedge block, relative to the tightening wedge block, the locking block is located at a position, close to a middle of the lower connection frame, in the groove, one surface, making contact with the locking block, of the tightening wedge block is a bevel, one surface, making contact with the tightening wedge block, of the locking block is also a bevel, a height of the groove is equal to that of the locking block, the bevel of the tightening wedge block in the upward moving process can push the locking block to move transversely in the groove, and the locking block moves transversely so as to lock the second sliding part.

The second sliding part comprises a guiding and positioning block, a middle pipe and supporting feet, the guiding and positioning block is installed between the two outer side pipes, and has a guiding and positioning effect relative to sliding of the middle pipe, a lower surface of the guiding and positioning block is provided with the middle pipe, the middle pipe sequentially penetrates through the sliding frame and the lower connection frame to be connected with the supporting feet, a portion, penetrating through the lower connection frame, of the middle pipe is located in the groove of the lower connection frame, and can be locked or loosened by the locking block, and therefore the second sliding part can be controlled to achieve a static or sliding state.

The fixed part is provided with a magnetic latch device, the magnetic latch device comprises a first sliding frame, a second sliding frame, a third sliding frame, magnetic blocks and protective covers, the first sliding frame is provided with a first positioning and guiding hole and a second positioning and guiding hole, the two fixed supporting rods are respectively located in the first positioning and guiding hole and the second positioning and guiding hole, every two of the first sliding frame, the second sliding frame and the third sliding frame are in butt joint due to attracting of the magnetic blocks, butt joint surfaces of the first sliding frame and the second sliding frame are provided with grooves, the magnetic block is installed in the groove, a bottom surface of the groove is provided with an opening for the magnetic block to be inserted and installed, a bottom surface of the magnetic block is provided with the protective cover, the protective cover is installed at a position of the opening, two opposite side surfaces of the magnetic block are respectively provided with a first sliding groove and a second sliding groove, attracting portions and clamping strip portions of the magnetic block are on both sides of the first sliding groove and the second sliding groove, an inner side wall of the groove is provided with a sliding strip corresponding to the first sliding groove, the sliding strip is arranged in the first sliding groove, the other inner side wall of the groove is provided with a guiding strip, the guiding strip comprises a guiding portion and an inwards-concaved portion, the guiding portion is located in front of the inwards-concaved portion, and the guiding portion is arranged in the second sliding groove.

The sliding frames are completely the same in structure, butt joint surfaces of the sliding frames are also provided with grooves used for installing the magnetic blocks, and an installing manner and a position of the magnetic block in the groove in the butt joint surface of each sliding frame are completely the same as those of a structure of the first sliding frame.

The pulling handle comprises a connection portion and a handheld portion, the connection portion is trapezoidal, a front side of the handheld portion is rectangular, a cross section of the handheld portion is in an arch shape, the handheld portion is provided with a handheld through groove, one side of the handheld through groove is provided with a first side through hole, the other side of the handheld through groove is provided with a second side through hole, a first upper through hole and a second upper through hole are formed above the handheld through groove, the first side through hole and the second side through hole are symmetrically formed, and the first upper through hole and the second upper through hole are symmetrically formed. The handheld through groove is trapezoidal, the first side through hole and the second side through hole are triangular, and the first upper through hole and the second upper through hole are in a water drop shape.

A lower bottom surface of the first sliding frame is provided with a placement hole, an adjusting wrench is arranged in the placement hole, the adjusting wrench comprises an upper locking block adjusting wrench and a lower locking block adjusting wrench, the upper locking block adjusting wrench comprises a handheld portion and a limiting portion, the limiting portion comprises four petal-shaped bodies and an overall outer surface is cylindrical, a top end of each petal-shaped body is provided with a limiting convex block and an overall outer surface is conical, and the petal-shaped body is located in the placement hole, an opening extending groove is formed above the limiting portion, the limiting convex block is located in the opening extending groove, a bottom of the handheld portion is provided with a hexagon wrench, an anti-falling rubber sheet is arranged in the hexagon wrench, a middle of the anti-falling rubber sheet is provided with a wrench positioning hole, the handheld portion and the limiting portion are each internally provided with a through hole, the lower locking block adjusting wrench comprises a hand lever portion and an adjusting column, the hand lever portion is fixed to a bottom end of the adjusting column, the adjusting column sequentially penetrates through the wrench positioning hole and the through hole, during installing, the limiting portion is firstly placed in the placement hole, the four petal-shaped bodies are closed, the limiting convex block on the top is enabled to pass through the placement hole at the same time, then the adjusting wrench penetrates into the through hole to make the four pedal-shaped bodies open, and meanwhile the limiting convex block on the top is enabled to be fixed in the opening extending groove.

An inner side of the lower connection frame is provided with an installing hole, a stopping block is arranged in the installing hole, the stopping block and the lower connection frame are fixedly installed through a self-tapping screw, the stopping block is used for dust prevention and attractiveness, and a structure is more steady.

Beneficial Effects of the Invention

1. The bearing frame of the present application is provided with a single pulling handle, and the locking plate in the upper locking mechanism can be controlled to lock or loosen the fixed supporting rods so that whether the first sliding part is in a movable state or not can be controlled; and meanwhile, the single pulling handle can also control up-down movement of the tightening block through the connection rod and the tightening rod so as to control whether the bevel of the tightening block pushes and presses the locking block or not, which results in locking or loosening of the locking block on the middle pipe, so that whether the second sliding part is in a static or sliding state or not can be controlled, it is achieved that one pulling handle can control locking or loosening of the first sliding part and the second sliding part, and a using effect is achieved.

2. According to an adjustable function of the bearing frame, adjustment is performed through a middle hole of the tightening wedge block and right-hand and left-hand threads on the tightening rod, by rotating the tightening rods forwards and reversely, a distance between the upper pulling block and the tightening wedge block can be increased or decreased, it is achieved that relative positions of the tightening wedge block and the locking block are adjusted, and therefore decreasing or increasing of locking force is achieved. Due to the fact that an advanced locking process that the thread is loose, but does not fall is adopted, an adjusting effect can be more effective and safer, and efficiency is higher in use.

3. Every two of the first sliding frame, the second sliding frame and the third sliding frame of the bearing frame are mutually attracted through the magnetic blocks to be in butt joint, when a camera support is put away, the sliding frames are automatically attracted through attracting force of the magnetic blocks, when the camera support is used, the three sliding frames are respectively pulled outwards, so that the sliding frames can overcome magnetic force to be separated from each other, using is easier and more convenient relative to a clamped connection manner of buckles, durability is better, and damage is not likely to be caused.

4. A cross section of the base of the bearing frame is in a shape of a regular triangle, a structure is steady, an edge is in an arc shape, carrying on the shoulder of a user is convenient, it conforms to a morphological characteristic of a human body, a comfort level is enhanced, and an implementing effect is very ideal.

5. The pulling handle of the bearing frame of the present application is novel in design, the structure is safe and reliable, operation is convenient, a bottom is designed into an arch shape, using through the hand is convenient, due to the arrangement of the through groove and the through hole in the pulling handle, grabbing by fingers is facilitated, and operation is more comfortable.

6. The adjusting wrench of the bearing frame of the technical scheme is connected with the first sliding frame in a buckled manner, carrying is convenient, using is also convenient, the structure is reasonable, operation is convenient, and when an adjusting condition of the locking frame is not ideal, the two tools of an upper locking block adjusting wrench and a lower locking block adjusting wrench can be respectively used for adjusting the locking control device, so that the bearing frame meets a using effect.

Figure 1:
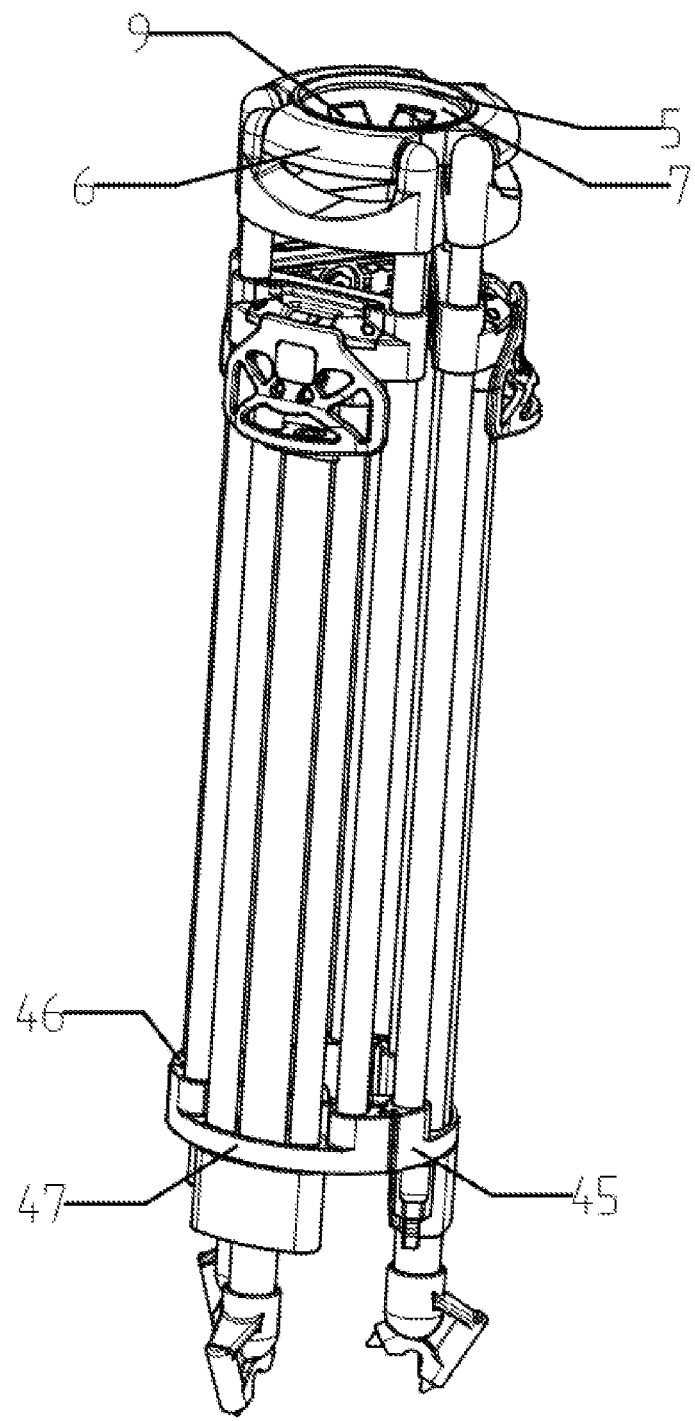
FIG. 1 is a structural schematic view of a bearing frame of the present application.
Figure 2:
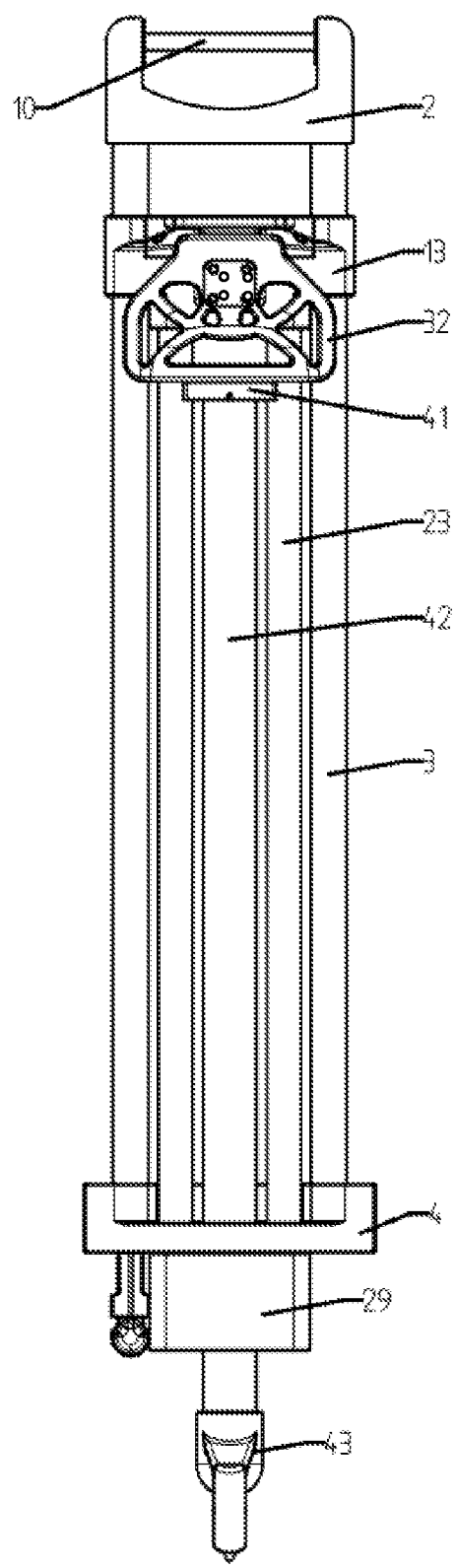
FIG. 2 is a front side schematic view of the bearing frame of the present application.
Figure 3:
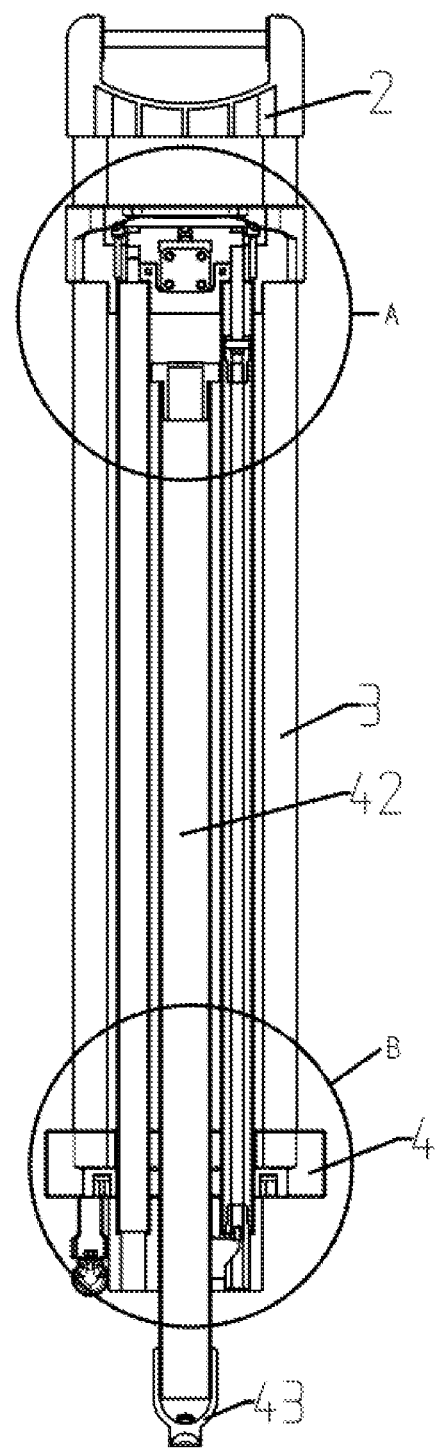
FIG. 3 is a section view of the bearing frame of the present application.
Figure 4:
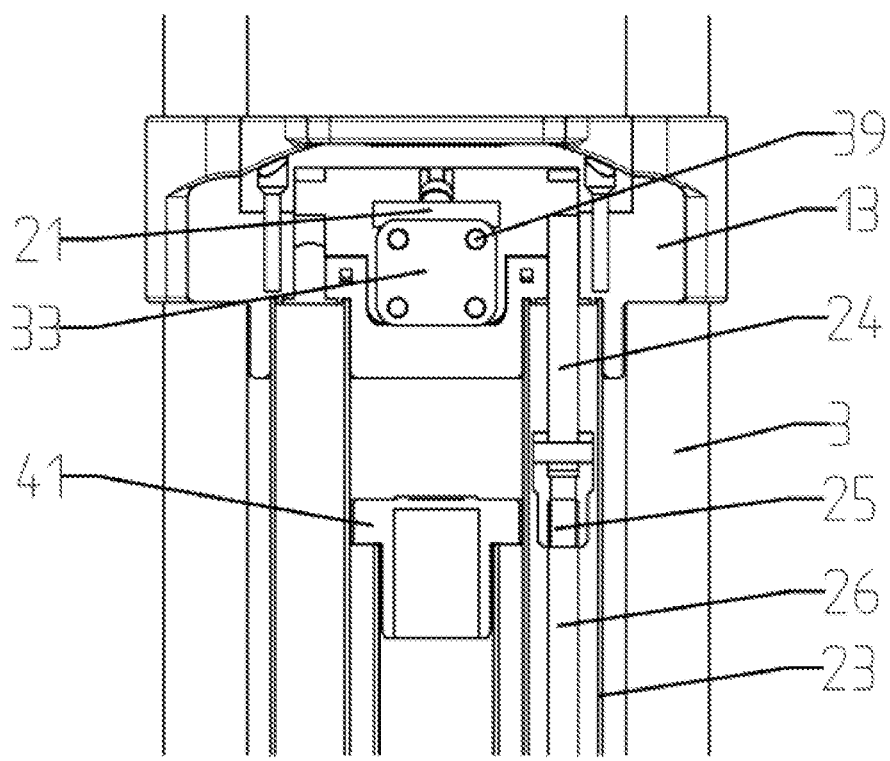
FIG. 4 is an amplified schematic view of a position A in FIG. 3 of the present application.
Figure 5:
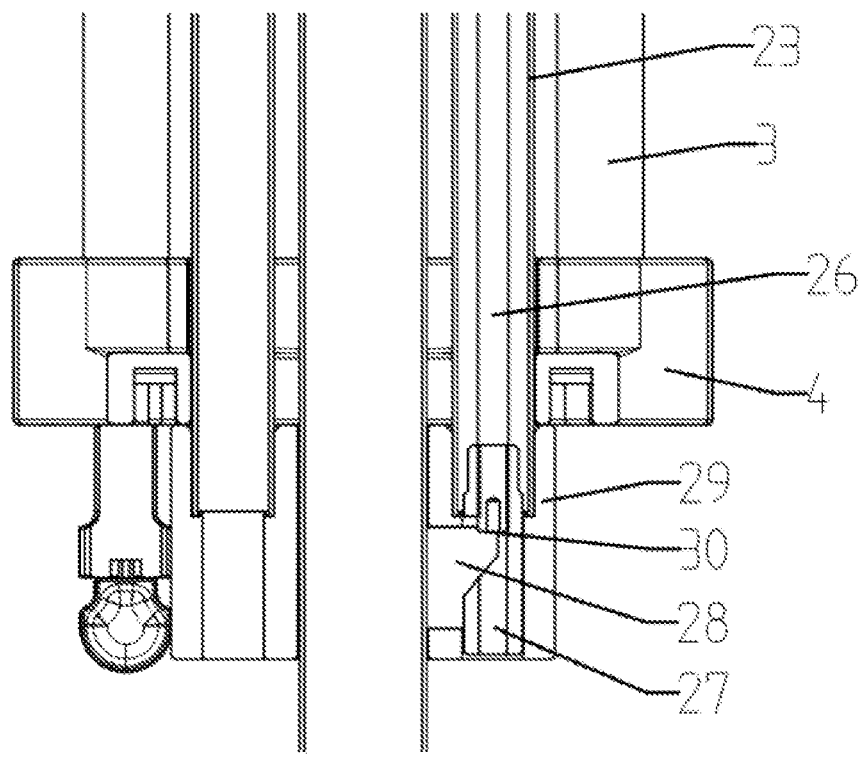
FIG. 5 is an amplified schematic view of a position B in FIG. 3 of the present application.
Figure 6:
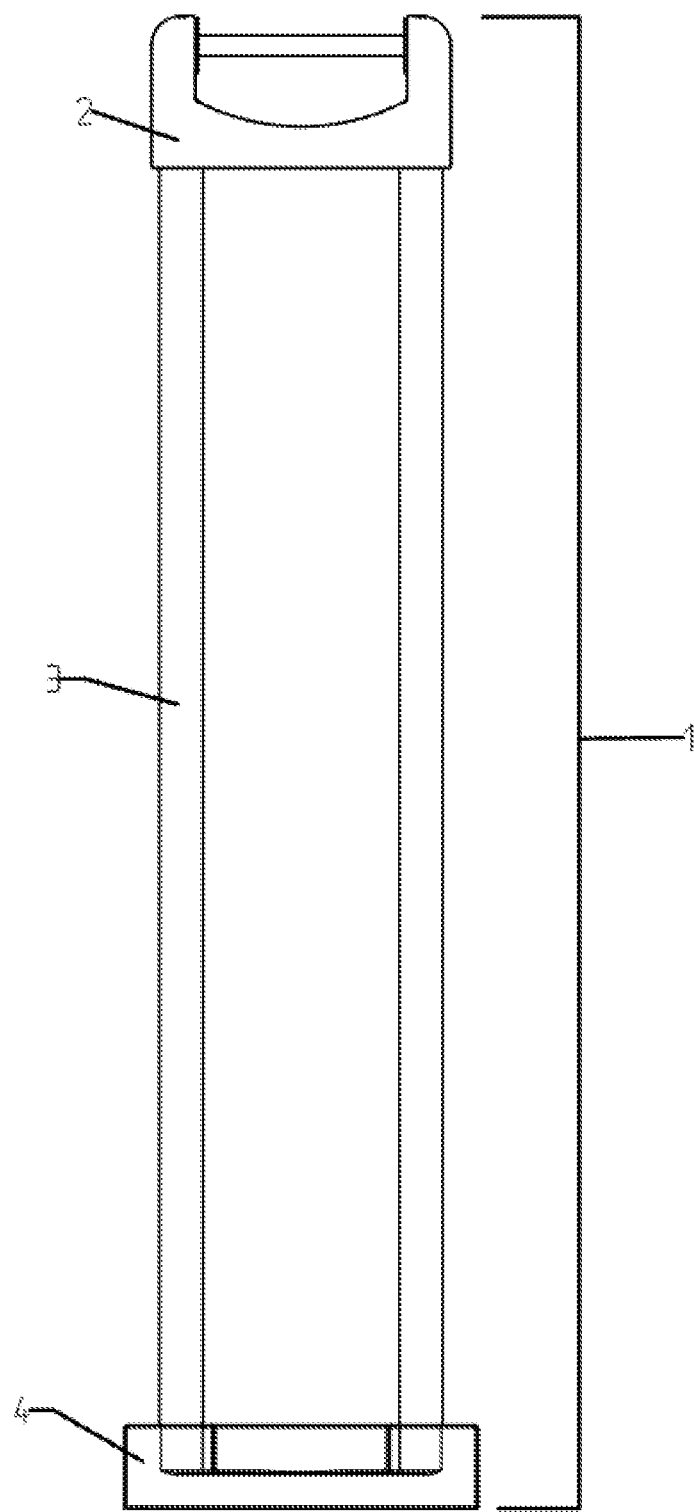
FIG. 6 is a schematic view of a fixed part of the bearing frame of the present application.
Figure 7:
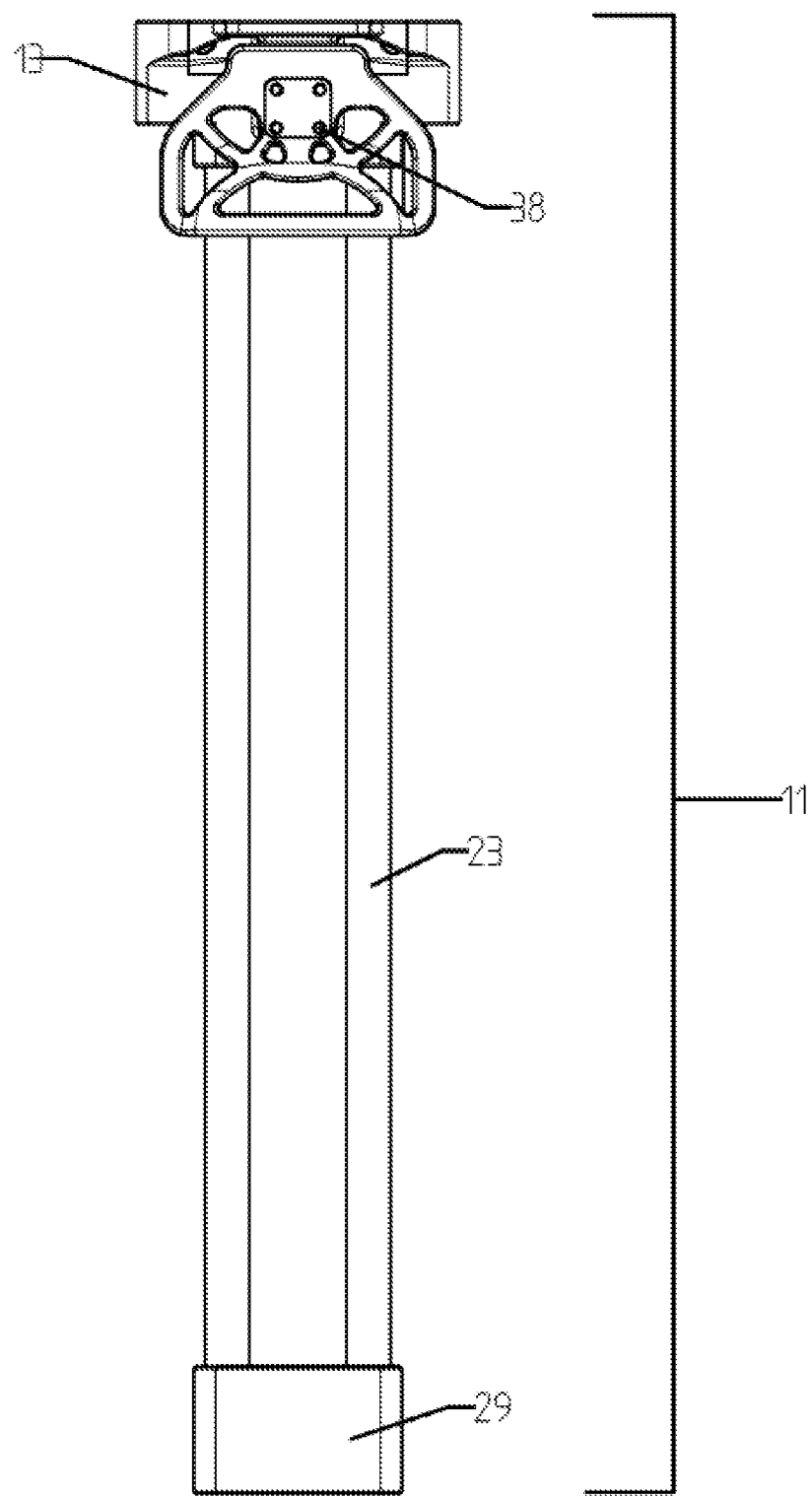
FIG. 7 is a schematic view of a first sliding part of the bearing frame of the present application.
Figure 8:
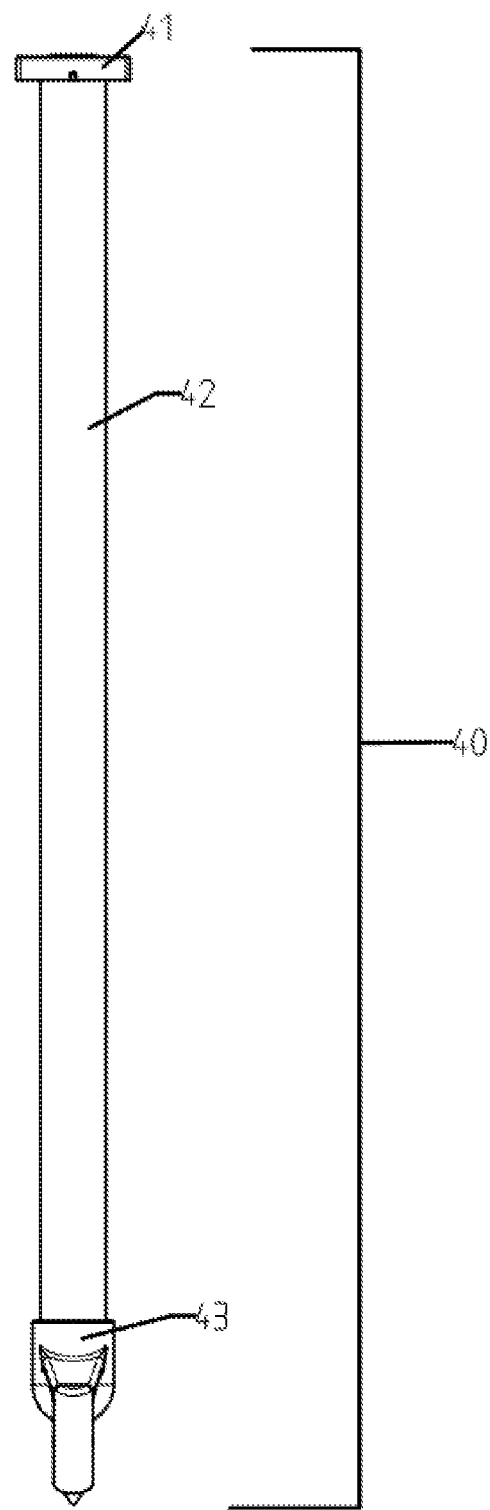
FIG. 8 is a schematic view of a second sliding part of the bearing frame of the present application
Figure 9:
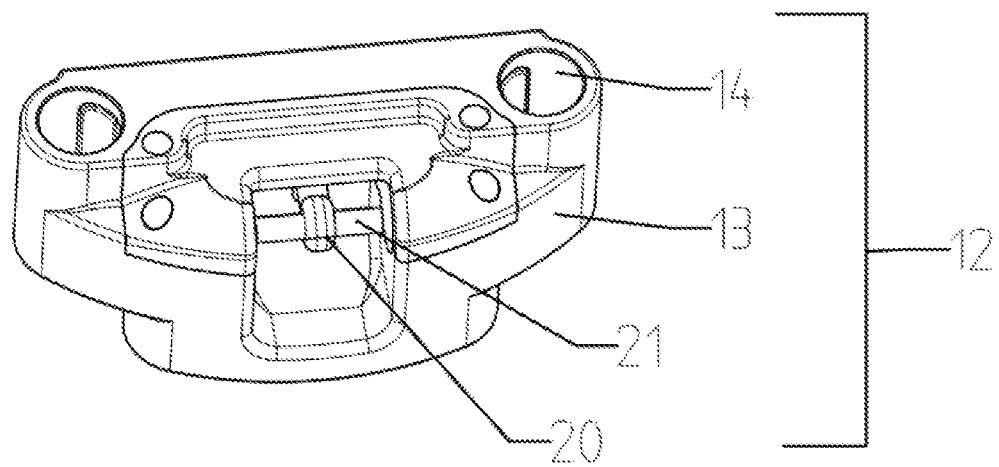
FIG. 9 is a schematic view of an upper locking mechanism of the bearing frame of the present application.
Figure 10:
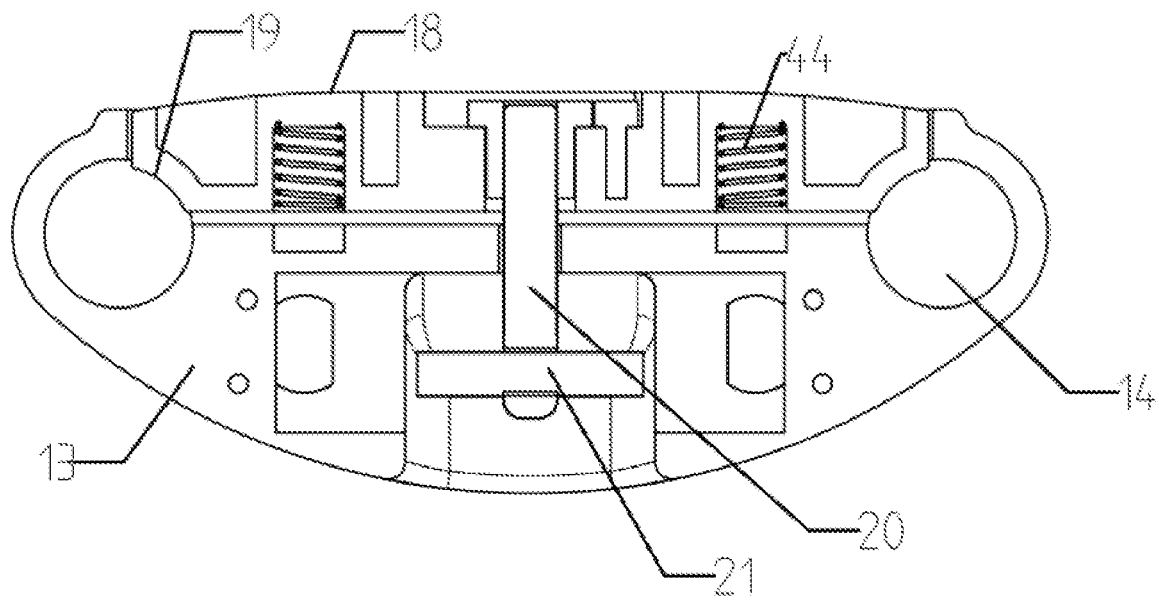
FIG. 10 is a top section view of the upper locking mechanism of the bearing frame of the present application.
Figure 11:
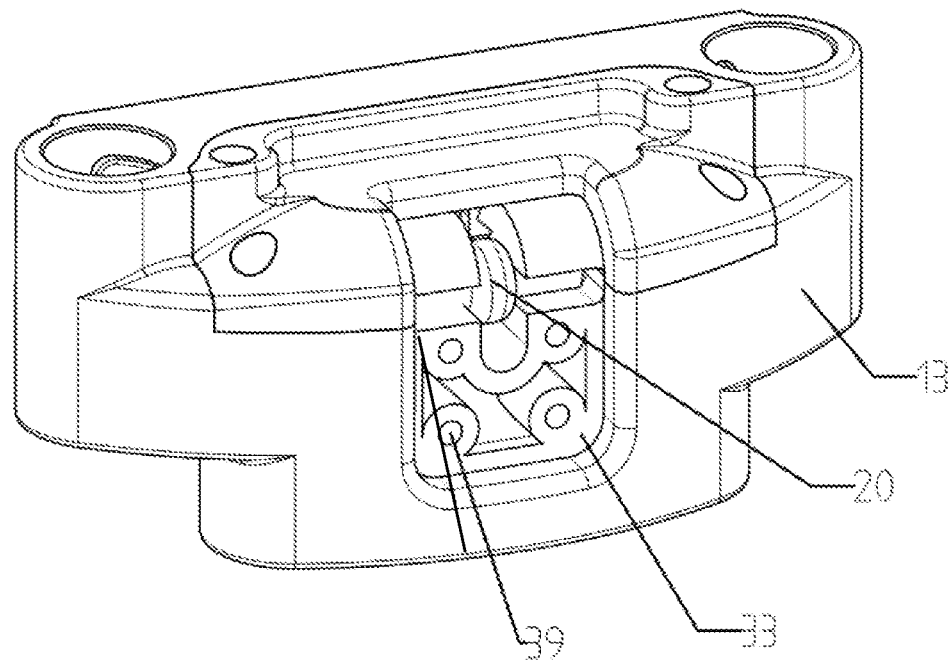
FIG. 11 is a schematic view of the upper locking mechanism, provided with a pulling handle core, of the bearing frame of the present application.
Figure 12:
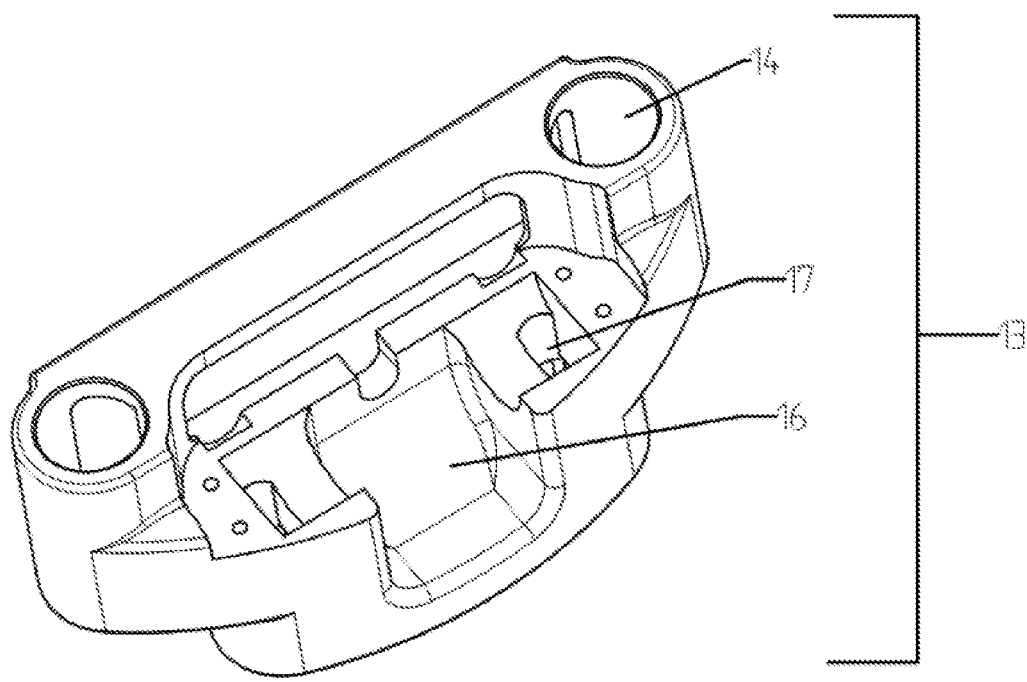
FIG. 12 is a schematic view of an upper connection frame of the bearing frame of the present application.
Figure 13:
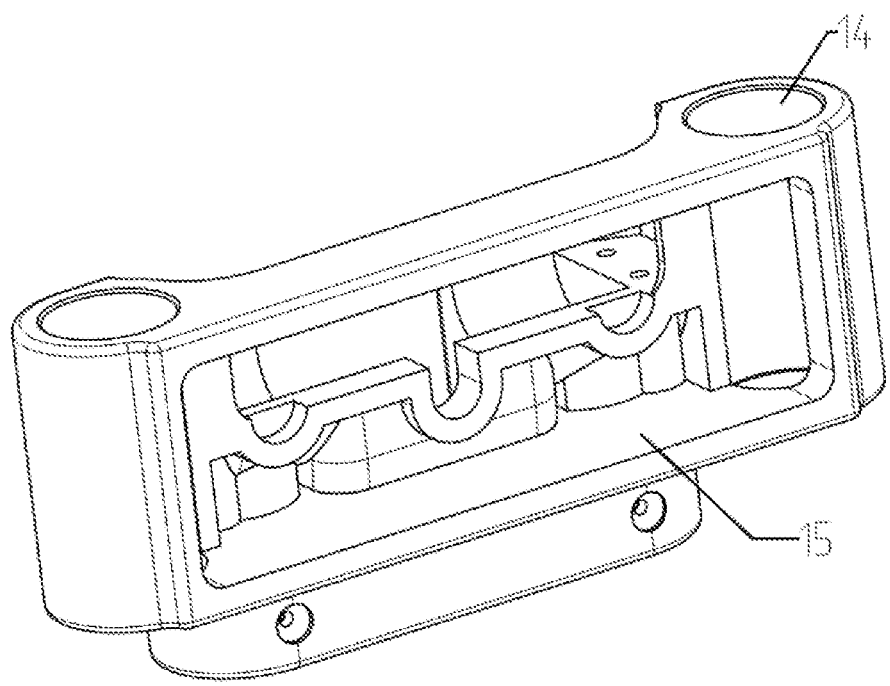
FIG. 13 is a schematic view of the upper connection frame of the bearing frame of the present application at another angle.
Figure 14:
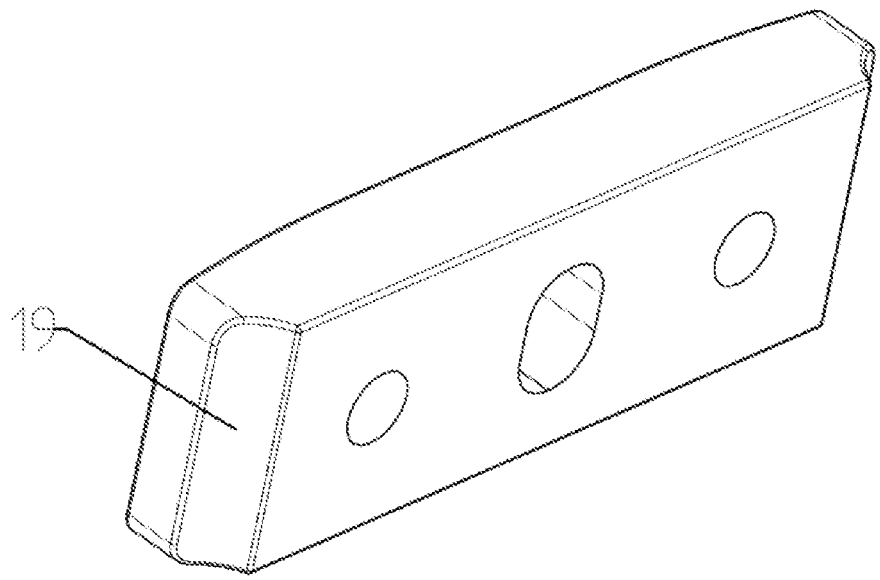
FIG. 14 is a schematic view of a locking plate of the bearing frame of the present application.
Figure 15:
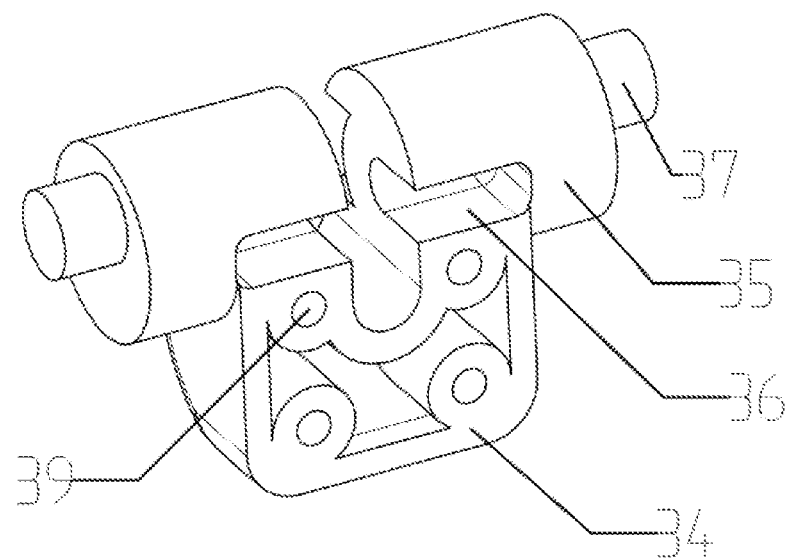
FIG. 15 is a schematic view of the pulling handle core of the bearing frame of the present application.
Figure 16:
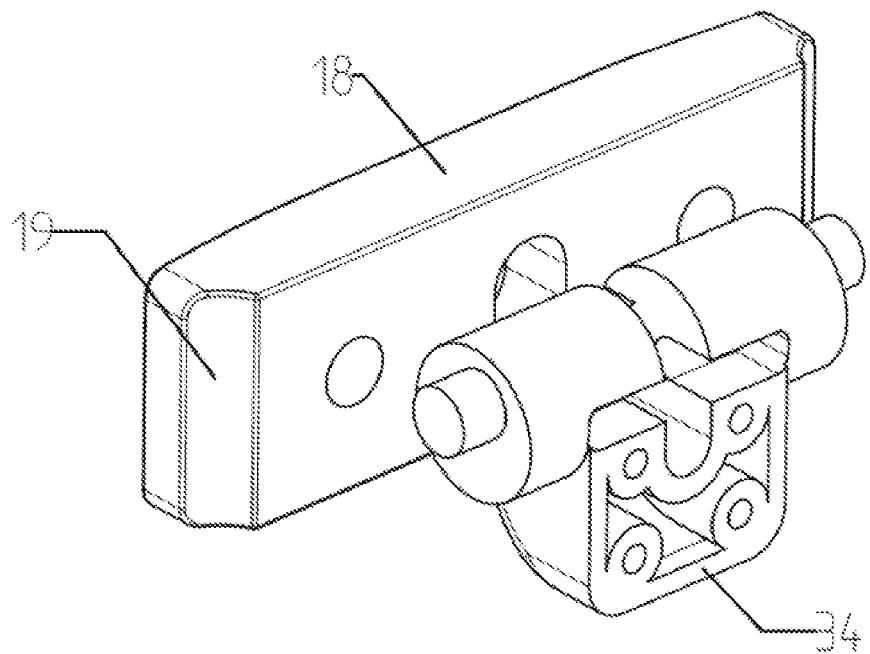
FIG. 16 is a three-dimensional schematic view of a connection manner of the pulling handle core and the locking plate of the bearing frame of the present application.
Figure 17:
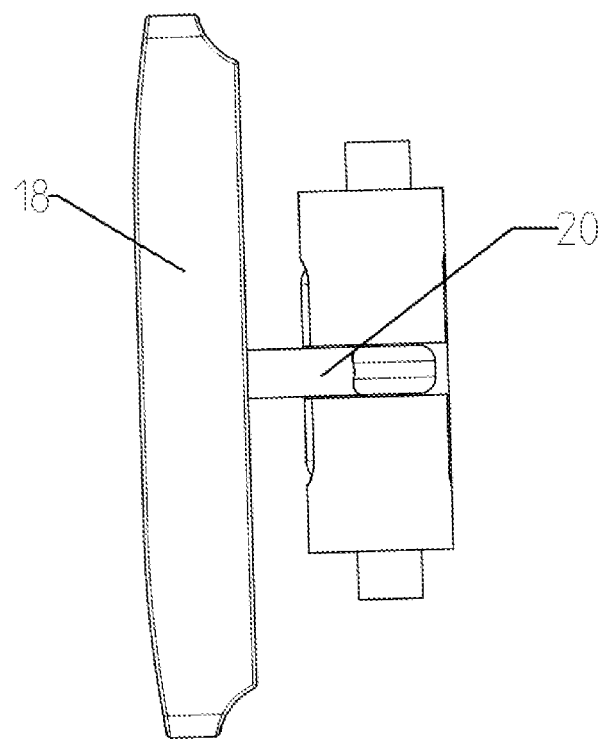
FIG. 17 is a top view of the connection manner of the pulling handle core and the locking plate of the bearing frame of the present application.
Figure 18:
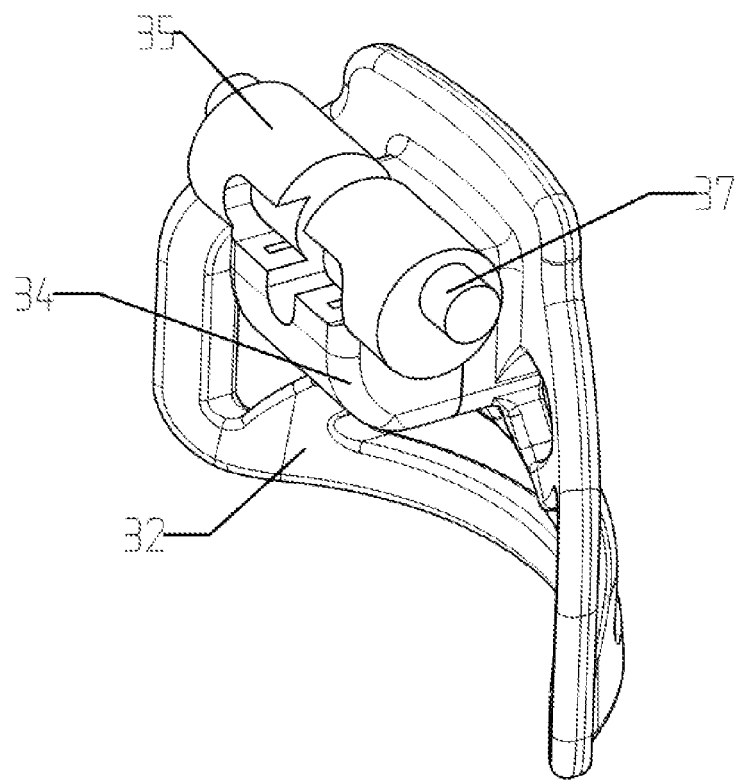
FIG. 18 is a three-dimensional schematic view of a locking control device of the bearing frame of the present application.
Figure 19:
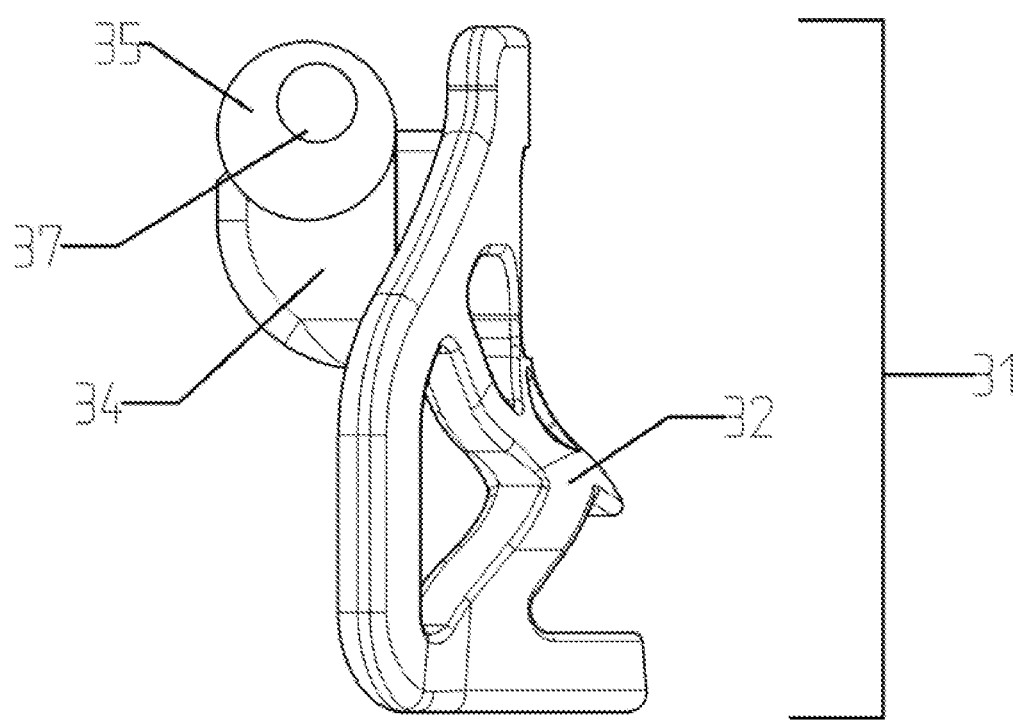
FIG. 19 is a side surface schematic view of the locking control device of the bearing frame of the present application.
Figure 20:
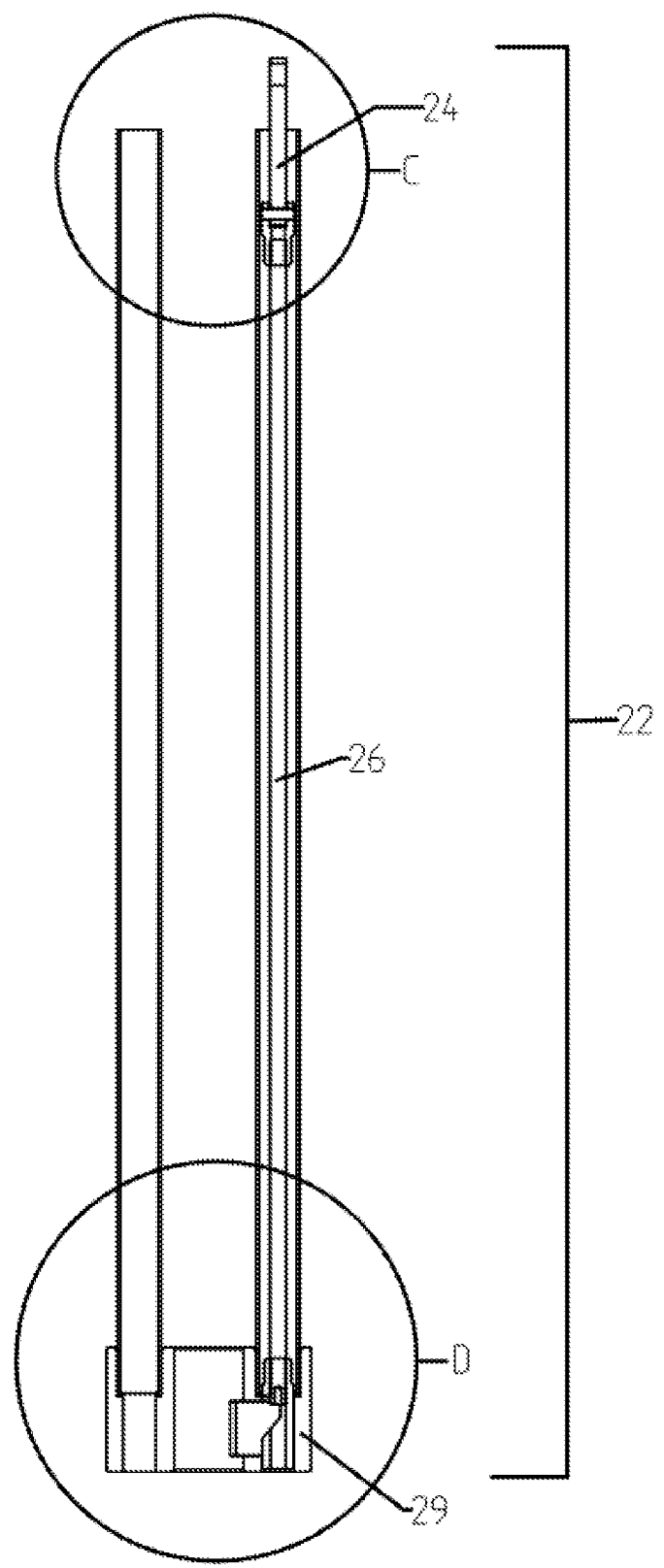
FIG. 20 is a section view of a lower locking mechanism of the bearing frame of the present application.
Figure 21:
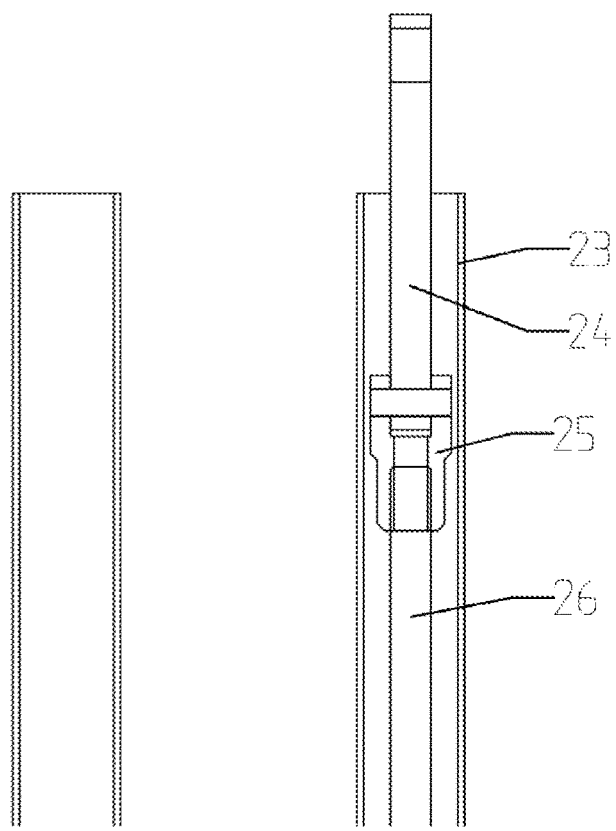
FIG. 21 is an amplified schematic view of a position C in FIG. 20 of the present application.
Figure 22:
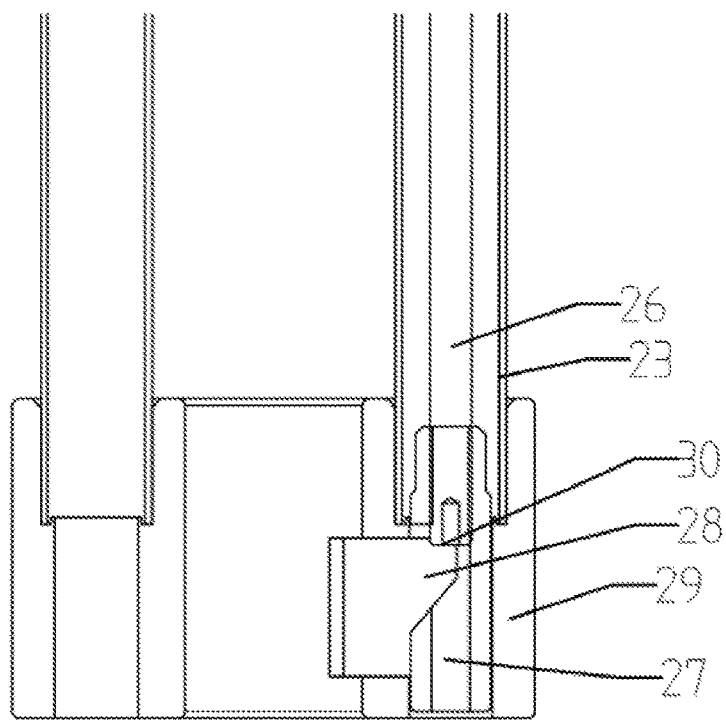
FIG. 22 is an amplified schematic view of a position D in FIG. 20 of the present application.
Figure 23:
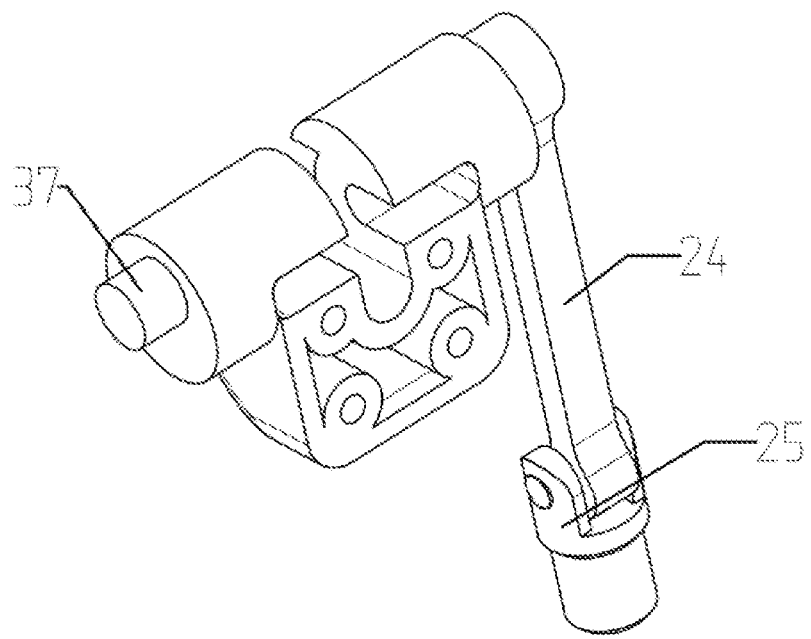
FIG. 23 is a connection relationship schematic view of the pulling handle core and a connection rod of the bearing frame of the present application.
Figure 24:
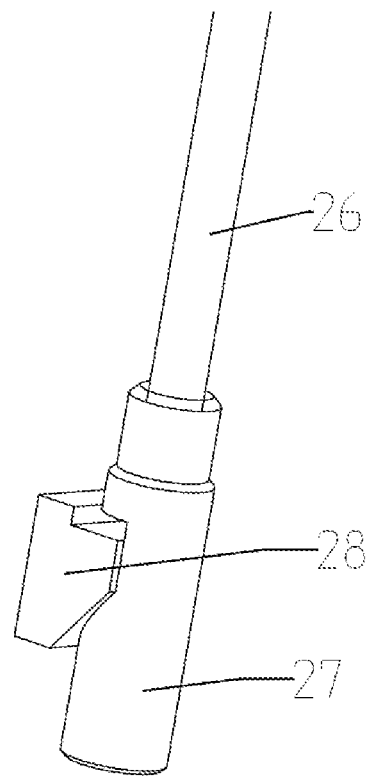
FIG. 24 is a position relationship schematic view of a wrench locking block and a tightening block of the bearing frame of the present application.
Figure 25:
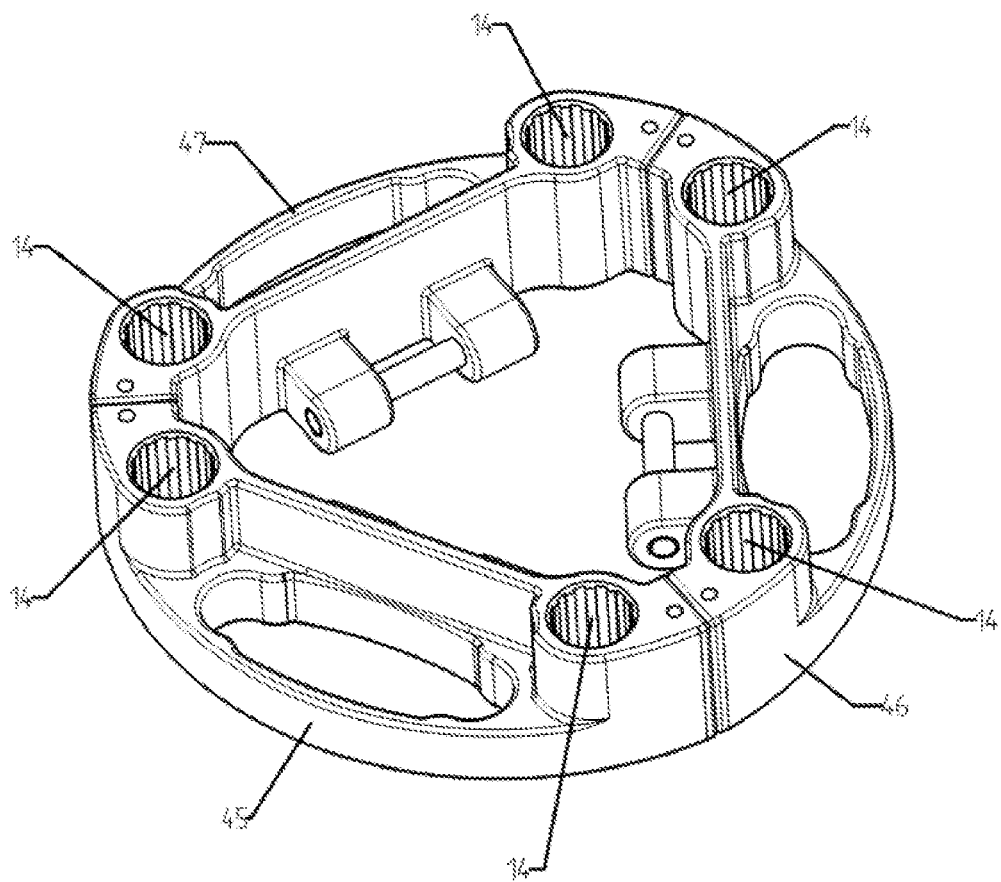
FIG. 25 is a three-dimensional schematic view of a magnetic latch device of the bearing frame of the present application.
Figure 26:
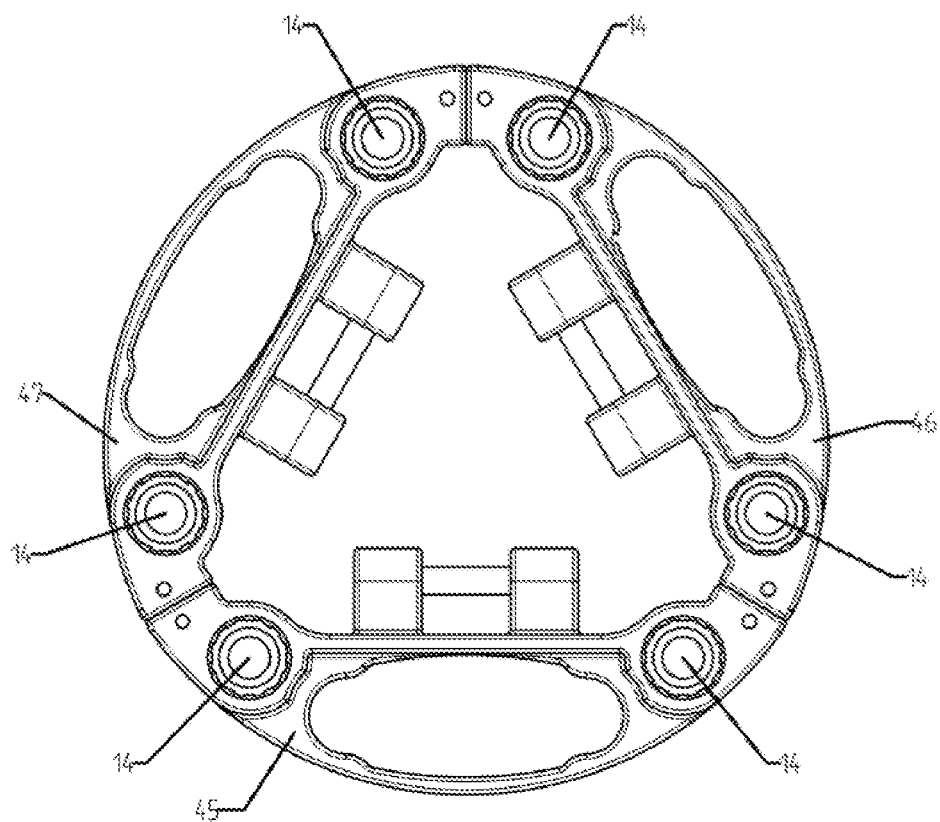
FIG. 26 is a top section view of the magnetic latch device of the bearing frame of the present application.
Figure 27:
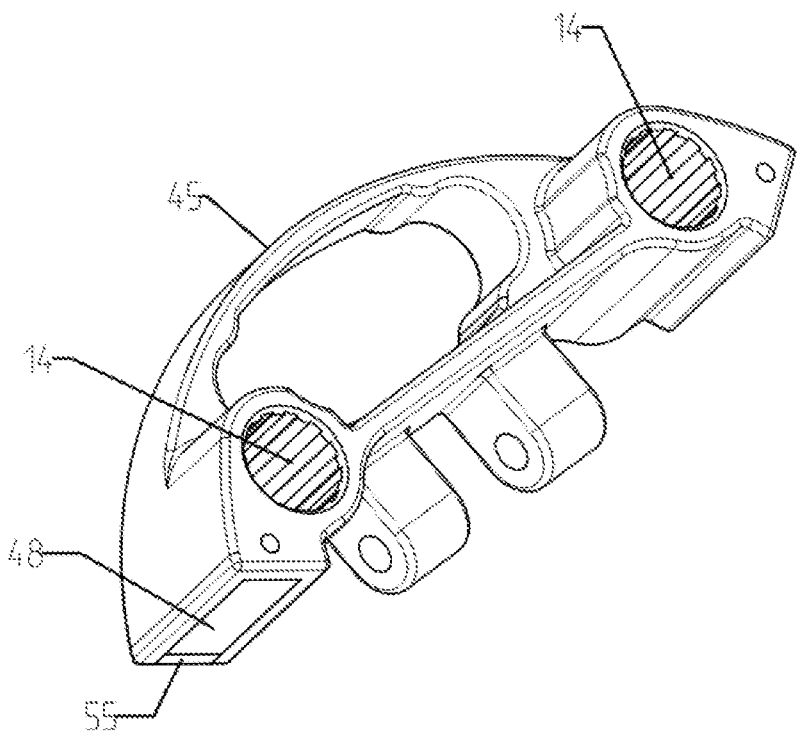
FIG. 27 is a schematic view of a first sliding frame, provided with a magnetic block and a protective cover, of the bearing frame of the present application.
Figure 28:
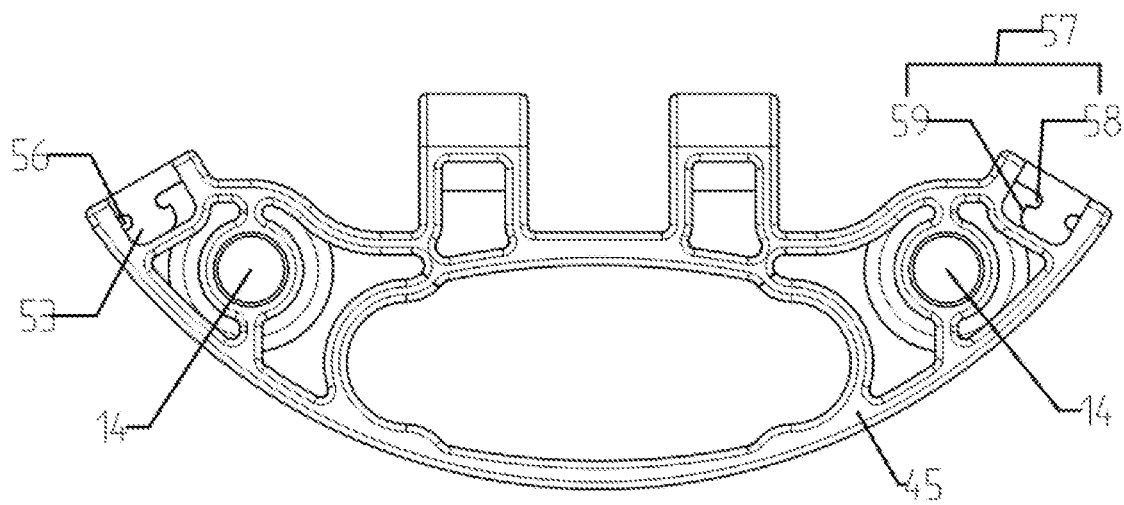
FIG. 28 is a bottom schematic view of the first sliding frame of the bearing frame of the present application.
Figure 29:
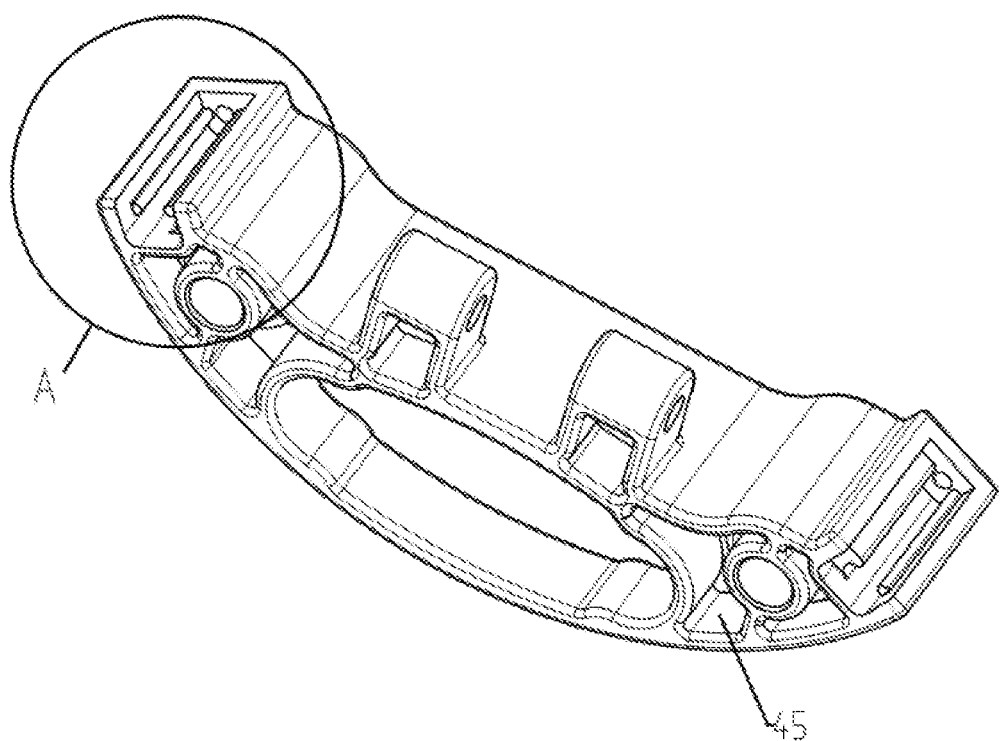
FIG. 29 is a three-dimensional schematic view of the first sliding frame of the bearing frame of the present application.
Figure 30:
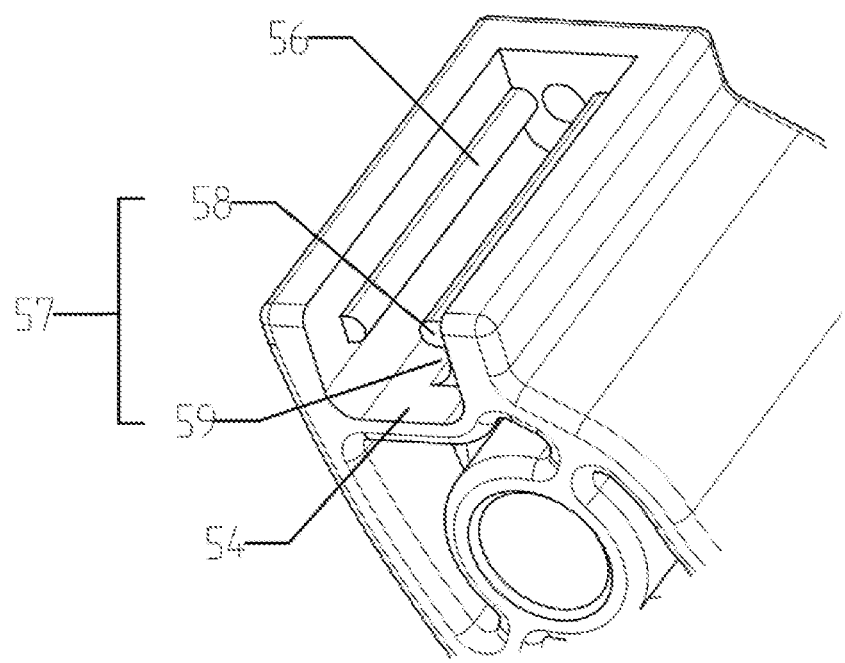
FIG. 30 is an amplified schematic view of a position A in FIG. 29 of the present application.
Figure 31:
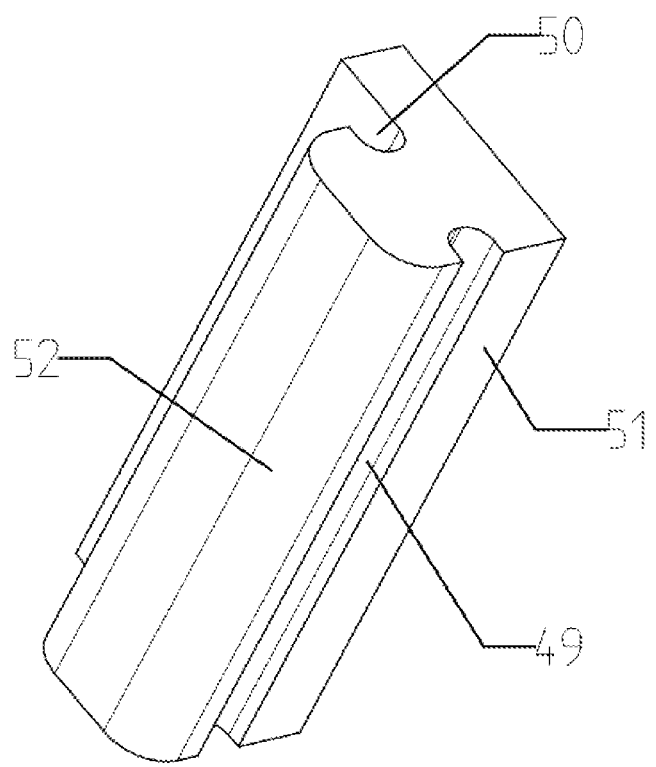
FIG. 31 is a schematic view of the magnetic block of the bearing frame of the present application.
Figure 32:
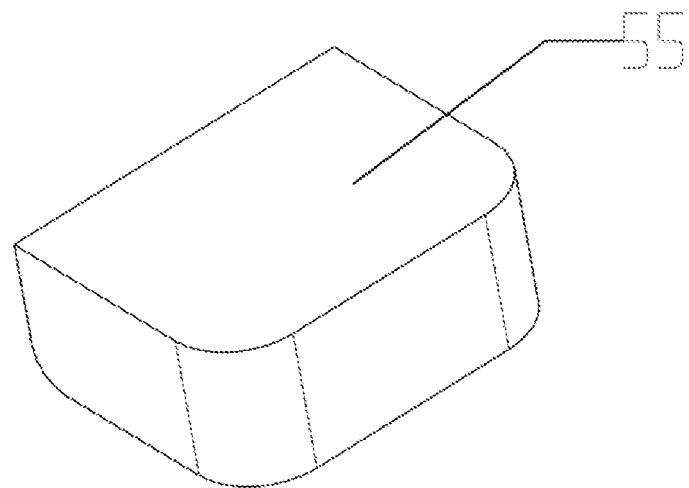
FIG. 32 is a schematic view of the protective cover of the bearing frame of the present application.
Figure 33:
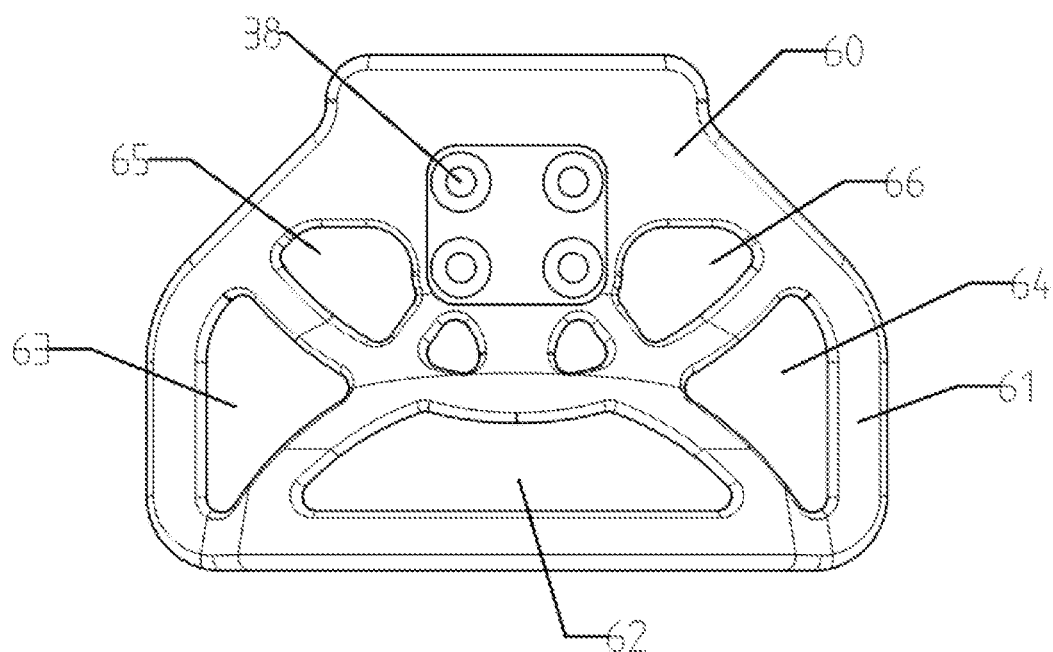
FIG. 33 is a structural schematic view of a pulling handle of the bearing frame of the present application.
Figure 34:
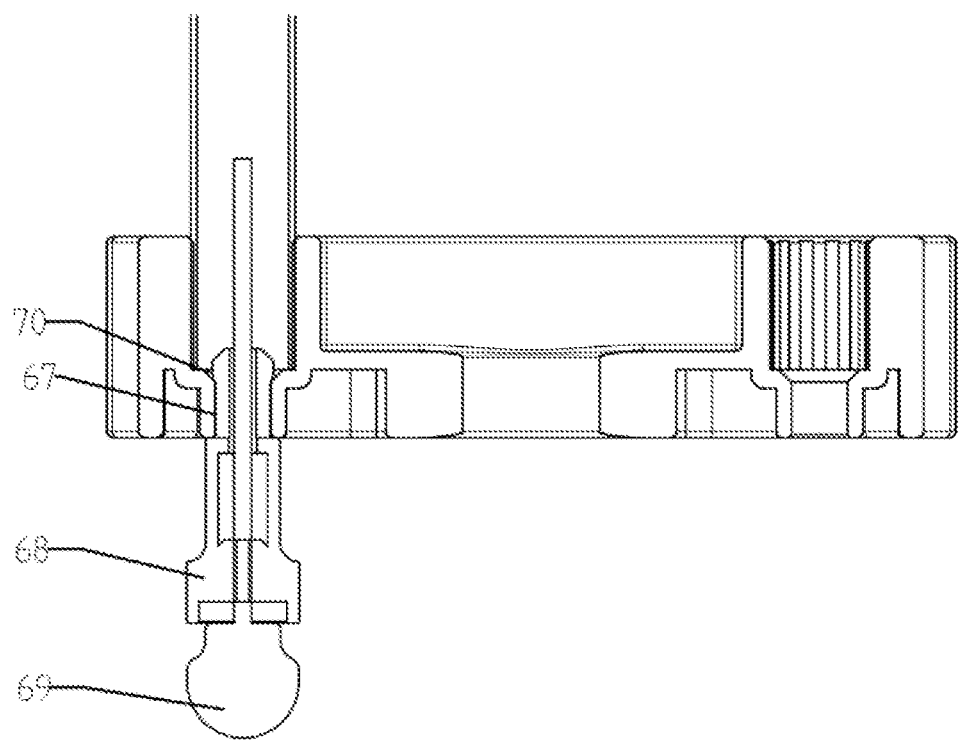
FIG. 34 is an installing schematic view of an adjusting wrench of the bearing frame of the present application.
Figure 35:
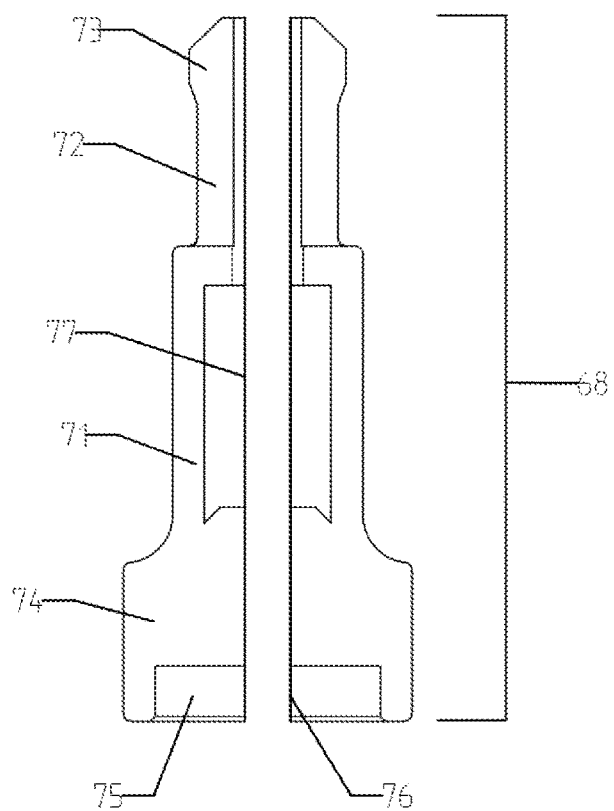
FIG. 35 is a structural schematic view of an upper locking block adjusting wrench of the bearing frame of the present application.
Figure 36:
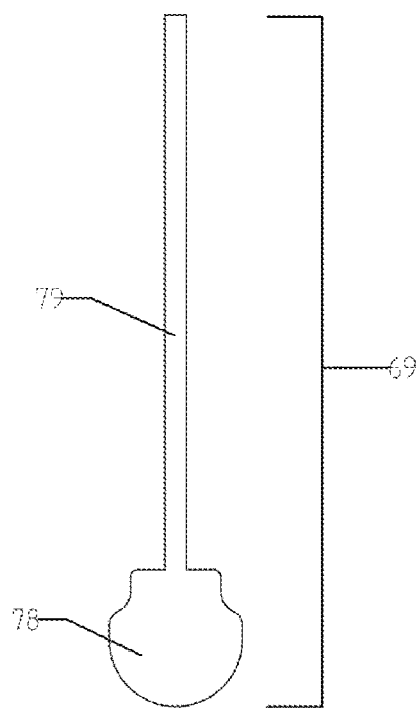
FIG. 36 is a structural schematic view of a lower locking block adjusting wrench of the bearing frame of the present application.
Figure 37:
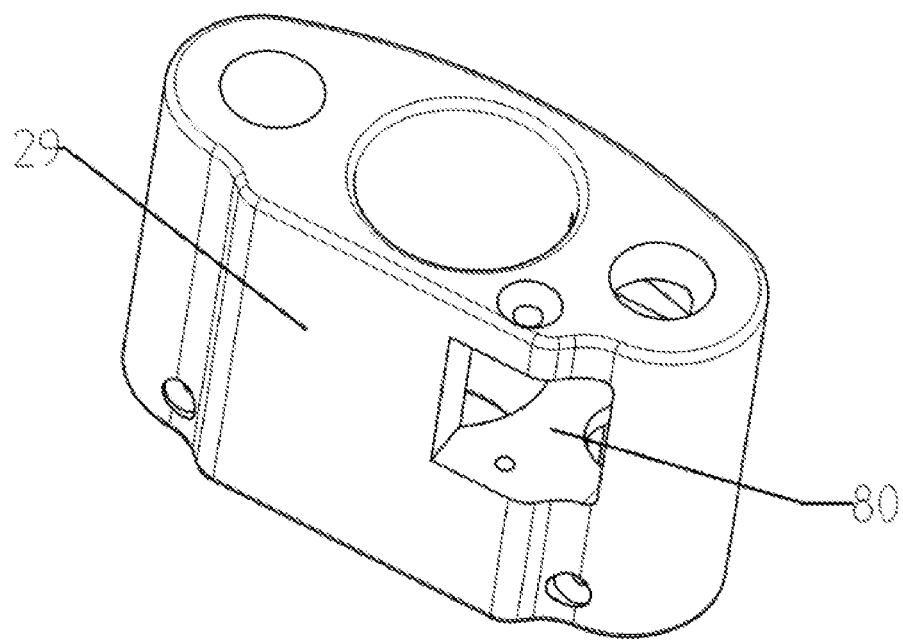
FIG. 37 is a structural schematic view of a lower connection frame of the bearing frame of the present application.
Figure 38:
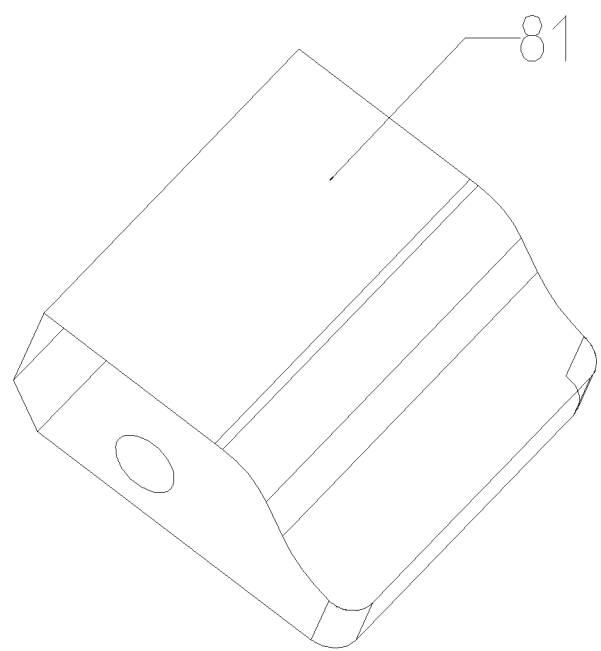
FIG. 38 is a structural schematic view of a stopping block of the present application.

1—fixed part, 2—fork frame, 3—fixed supporting rod, 4—sliding frame, 5—base, 6—shaft fixing base, 7—bracket, 8—round hole, 9—lightening hole, 10—fixed connection shaft, 11—first sliding part, 12—upper locking mechanism, 13—upper connection frame, 14—guiding and positioning hole, 15—locking plate groove, 16—core body installing groove, 17—swinging shaft through groove, 18—locking plate, 19—arc-shaped surface, 20—swing bolt, 21—eccentric rod, 22—lower locking mechanism, 23—outer side pipe, 24—connection rod, 25—upper pulling block, 26—tightening rod, 27—tightening wedge block, 28—locking block, 29—lower connection frame, 30—groove, 31—locking control device, 32—pulling handle, 33—pulling handle core, 34—core body base, 35—swinging shaft, 36—eccentric rod groove, 37—eccentric boss shaft, 38—screw installing hole, 39—screw hole, 40—second sliding part, 41—guiding and positioning block, 42—middle pipe, 43—supporting foot, 44—spring, 45—first sliding frame, 46—second sliding frame, 47—third sliding frame, 48—magnetic block, 49—first sliding groove, 50—second sliding groove, 51—attracting portion, 52—clamping strip portion, 53—groove, 54—opening, 55—protective cover, 56—sliding strip, 57—guiding strip, 58—guiding portion, 59—inwards-concaved portion, 60—connection portion, 61—handheld portion, 62—handheld through groove, 63—first side through hole, 64—second side through hole, 65—first upper through hole, 66—second upper through hole, 67—placement hole, 68—upper locking block adjusting wrench, 69—lower locking block adjusting wrench, 70—opening extending groove, 71—handheld portion, 72—limiting portion, 73—limiting convex block, 74—internal hexagonal wrench, 75—anti-falling rubber sheet, 76—wrench positioning hole, 77—through hole, 78—hand lever portion, 79—adjusting column, 80—installing hole, 81—stopping block.

DETAILED DESCRIPTION OF THE INVENTION

According to a single-hand-lever double-joint-control adjustable hoop type bearing frame, the bearing frame comprises a fixed part 1, the fixed part 1 comprises a fork frame 2, fixed supporting rods 3 and a sliding frame 4, a base 5 is arranged above the fork frame 2, a middle portion of a plane of the base 5 is a conical molded surface, a side surface is provided with three shaft fixing bases 6, outer surfaces of the three shaft fixing bases 6 are each in an arc shape, a shaft installing groove is arranged in the arc shape of the shaft fixing base, each of the three shaft installing grooves is internally provided with a fixed connection shaft 10, two ends of the three fixed connection shafts 10 are both connected with two side lugs at a top end of the fork frame 2, a center bottom of the base 5 is provided with a bowl-shaped bracket 7, a center of the bracket 7 is provided with a round hole 8, the bracket 7 is further provided with uniformly distributed lightening holes 9, the two fixed supporting rods 3 arranged in parallel are connected with the fork frame 2, top ends of the two fixed supporting rods 3 are inserted and installed at lower ends of the side lugs of the fork frame 2, the sliding frame 4 is installed at bottom ends of the two fixed supporting rods 3, and a first sliding part 11 and a second sliding part 40 are further included.

The first sliding part 11 is installed on the fixed supporting rod 3 in a sleeving manner, and can be locked or slide relative to the fixed supporting rod 3, the first sliding part 11 comprises an upper locking mechanism 12, a lower locking mechanism 22 and a locking control device 31, and the locking control device 31 controls locking or loosening of the upper locking mechanism 12 on the fixed supporting rod 3.

The upper locking mechanism 12 comprises an upper connection frame 13, a locking plate 18, a swing bolt 20 and an eccentric rod 21, the upper connection frame 13 is provided with guiding and positioning holes 14 for the fixed supporting rods 3 to pass through, the upper connection frame 13 is installed on the fixed supporting rod 3 in a sleeving manner through the guiding and positioning hole 14, a locking plate installing groove 15 is formed in the upper connection frame 13, the locking plate groove 15 communicates with the guiding and positioning hole 14 at a position of a groove edge, the locking plate 18 is installed in the locking plate groove 15, the locking plate 18 is provided with arc-shaped surfaces 19 to be used for clamping the fixed supporting rod 3, a side face of the locking plate 18 is connected with one end of the swing bolt 20, the other end of the swing bolt 20 is installed on the eccentric rod 21 in a sleeving manner, and movement of the eccentric rod 21 is transmitted through the locking control device 31.

The locking control device 31 comprises a pulling handle 32 and a pulling handle core 33, a core body base 34, swinging shafts 35 and eccentric boss shafts 37 are arranged on the pulling handle core 33, the swinging shafts 35 are arranged on two sides of the core body base 34, a front side of the upper connection frame 13 is provided with a corresponding core body installing groove 16 and swinging shaft through grooves 17, the swinging shaft 35 is installed in the swinging shaft through groove 17, the pulling handle core 33 is installed in the core body installing groove 16, the pulling handle 32 driving the core body base 34 to rotate is installed on a front side of the core body base 34, the core body base 34 is provided with four screw holes 39 to be connected and locked to the pulling handle through screws, the core body base 34 rotates around a shaft axis of the swinging shaft 35, the swinging shaft of the pulling handle core 33 is provided with an eccentric rod groove 36, the eccentric rod 21 is installed in the eccentric rod groove 36, an axis of the eccentric rod 21 deviates from an axis of the swinging shaft 35, and eccentric rotation of the eccentric rod 21 enables the swing bolt 20 to do push-pull movement.

The locking control device 31 can control locking or loosening of the lower locking mechanism 22 on the second sliding part 40, the eccentric boss shafts 37 are arranged on two sides of the swinging shaft of the pulling handle core 33, an axis of the eccentric boss shaft deviates from that of the swinging shaft 35 of the pulling handle core 33, the eccentric boss shaft 37 is connected with the lower locking mechanism 22, the eccentric boss shaft 37 is driven by eccentric swinging of the swinging shaft 35, so that the locking mechanism carries out locking or loosening on the second sliding part 40, the lower locking mechanism 22 comprises outer side pipes 23, a connection rod 24, an upper pulling block 25, a tightening rod 26, a tightening wedge block 27, a locking block 28 and a lower connection frame 29, an upper end of the outer side pipe 23 is connected with the upper connection frame 13, a bottom end of the outer side pipe 23 penetrates through the sliding frame 4 to be connected with the lower connection frame 29, the connection rod 24 is installed in the outer side pipe 23 on a single side, an upper end of the connection rod 24 is connected with the swinging eccentric boss shaft 37 in a hinged manner, the connection rod 24 can be driven to achieve up-down movement due to reciprocating swinging of the eccentric boss shaft 37, a bottom end of the connection rod 24 is connected with the upper pulling block 25 in a hinged manner, the upper pulling block 25 is in threaded connection with an upper end of the tightening rod 26, a bottom end of the tightening rod 26 penetrates through the sliding frame 4 to be provided with the tightening wedge block 27, the connection rod 24 can drive the tightening wedge block 27 to move up and down, the lower connection frame 29 is provided with a groove 30, the tightening wedge block 27 is located in the groove 30 of the lower connection frame 29, the locking block 28 is placed on one side of the tightening wedge block 27, relative to the tightening wedge block 27, the locking block 28 is located at a position, close to a middle of the lower connection frame 29, in the groove 30, one surface, making contact with the locking block 28, of the tightening wedge block 27 is a bevel, a height of the groove 30 is equal to that of the locking block 28, the bevel of the tightening wedge block 27 in the upward moving process can push the locking block 28 to move transversely in the groove 30, and the locking block 28 moves transversely so as to lock the second sliding part 40.

The second sliding part 40 comprises a guiding and positioning block 41, a middle pipe 42 and supporting feet 43, the guiding and positioning block 41 is installed between the two outer side pipes 23, and has a guiding and positioning effect relative to sliding of the middle pipe 42, a lower surface of the guiding and positioning block 41 is provided with the middle pipe 42, the middle pipe 42 sequentially penetrates through the sliding frame 4 and the lower connection frame 29 to be connected with the supporting feet 43, a portion, penetrating through the lower connection frame 29, of the middle pipe 42 is located in the groove of the lower connection frame 29, and can be locked or loosened by the locking block 28, and therefore the second sliding part 40 is controlled to achieve a static or sliding state.

The fixed part 1 is provided with a magnetic latch device, the magnetic latch device comprises a first sliding frame 45, a second sliding frame 46, a third sliding frame 47, magnetic blocks 48 and protective covers 55, the first sliding frame 45 is provided with a first positioning and guiding hole and a second positioning and guiding hole, the two fixed supporting rods 3 are respectively located in the first positioning and guiding hole and the second positioning and guiding hole, every two of the first sliding frame 45, the second sliding frame 46 and the third sliding frame 47 are in butt joint due to attracting of the magnetic blocks 48, butt joint surfaces of the first sliding frame 45 and the second sliding frame 46 are provided with grooves 53, the magnetic block 48 is installed in the groove 53, a bottom surface of the groove 53 is provided with an opening for the magnetic block 48 to be inserted and installed, a bottom surface of the magnetic block 48 is provided with the protective cover 55, the protective cover 55 is installed at a position of the opening 54, two opposite side surfaces of the magnetic block 48 are respectively provided with a first sliding groove 49 and a second sliding groove 50, attracting portions 51 and clamping strip portions 52 of the magnetic block 48 are arranged on both sides of the first sliding groove 49 and the second sliding groove 50, an inner side wall of the groove 53 is provided with a sliding strip 56 corresponding to the first sliding groove 49, the sliding strip 56 is arranged in the first sliding groove 49, the other inner side wall of the groove 53 is provided with a guiding strip 57, the guiding strip 57 comprises a guiding portion 58 and an inwards-concaved portion 59, the guiding portion 58 is located in front of the inwards-concaved portion 59, and the guiding portion 58 is arranged in the second sliding groove 50.

The second sliding frame 46, the third sliding frame 47 and the first sliding frame 45 are completely the same in structure, butt joint surfaces of the sliding frames are also provided with grooves used for installing the magnetic blocks, and an installing manner and a position of the magnetic block in the groove in the butt joint surface of each sliding frame are completely the same as those of a structure of the first sliding frame 45.

The pulling handle 32 comprises a connection portion 60 and a handheld portion 61, the connection portion 61 is trapezoidal, a front side of the handheld portion 61 is rectangular, a cross section of the handheld portion 61 is in an arch shape, the handheld portion 61 is provided with a handheld through groove 62, one side of the handheld through groove 62 is provided with a first side through hole 63, the other side of the handheld through groove 62 is provided with a second side through hole 64, and a first upper through hole 65 and a second upper through hole 66 are formed above the handheld through groove 62.

The first side through hole 63 and the second side through hole 64 are formed in an axisymmetric manner, and the first upper through hole 65 and the second upper through hole 66 are symmetrically formed.

The handheld through groove 62 is trapezoidal, the first side through hole 63 and the second side through hole 64 are triangular, and the first upper through hole 65 and the second upper through hole 66 are in a water drop shape.

A lower bottom surface of the first sliding frame 45 is provided with a placement hole 67, an adjusting wrench is arranged in the placement hole 67, the adjusting wrench comprises an upper locking block adjusting wrench 68 and a lower locking block adjusting wrench 69, the upper locking block adjusting wrench 68 comprises a handheld portion 71 and a limiting portion 72, the limiting portion 72 comprises four petal-shaped bodies and an overall outer surface is cylindrical, a top end of each petal-shaped body is provided with a limiting convex block and an overall outer surface is conical, and the petal-shaped body is located in the placement hole 67, an opening extending groove 70 is formed above the limiting portion 72, the limiting convex block 73 is located in the opening extending groove 70, a bottom of the handheld portion 71 is provided with a hexagon wrench 74, an anti-falling rubber sheet 75 is arranged in the hexagon wrench 74, a middle of the anti-falling rubber sheet 75 is provided with a wrench positioning hole 76, the handheld portion 71 and the limiting portion 72 are each internally provided with a through hole 77, the lower locking block adjusting wrench 69 comprises a hand lever portion 78 and an adjusting column 79, the hand lever portion 78 is fixed to a bottom end of the adjusting column 79, the adjusting column 79 sequentially penetrates through the wrench positioning hole 76 and the through hole 77, during installing, the limiting portion 72 is firstly placed in the placement hole 67, the four petal-shaped bodies are closed, the limiting convex block 73 on a top is enabled to pass through the placement hole 67 at the same time, then the adjusting wrench penetrates into the through hole 77 to make the four pedal-shaped bodies open, and meanwhile the limiting convex block 73 on the top is enabled to be fixed in the opening extending groove 70.

An inner side of the lower connection frame 29 is provided with an installing hole 80, a stopping block 81 is arranged in the installing hole 80, the stopping block 81 and the lower connection frame 29 are fixed and installed through a self-tapping screw, the stopping block 81 is used for dust prevention and attractiveness, and a structure is more steady.

The embodiment of the present application is illustrated in detail above, but the said content is only preferable embodiment of the present application, and is not intended to limit the implementation scope of the present application, so equivalent changes, improvements and the like made by use of the scope of the present application still belong to the patent scope of the present application.

What is claimed is:

1. A single-hand-lever double-joint-control adjustable hoop type bearing frame, which is characterized in that:

the bearing frame comprises a fixed part, the fixed part comprises a fork frame, fixed supporting rods and a sliding frame, a base is arranged above the fork frame, a middle portion of a plane of the base is a conical molded surface, a side surface is provided with three shaft fixing bases, outer surfaces of the three shaft fixing bases are each in an arc shape, a shaft installing groove is arranged in the arc shape of the shaft fixing base, each of the three shaft installing grooves is internally provided with a fixed connection shaft, two ends of the three fixed connection shafts are both connected with two side lugs at a top end of the fork frame, a center bottom of the base is provided with a bowl-shaped bracket, a center of the bracket is provided with a round hole, the bracket is further provided with uniformly distributed lightening holes, the two fixed supporting rods arranged in parallel are connected with the fork frame, top ends of the two fixed supporting rods are inserted and installed at lower ends of the side lugs of the fork frame, the sliding frame is further installed at bottom ends of the two fixed supporting rods, and a first sliding parts and a second sliding part are further included;

the first sliding part is installed on the fixed supporting rod in a sleeving manner, and can be locked or slide relative to the fixed supporting rod, the first sliding part comprises an upper locking mechanism, a lower locking mechanism and a locking control device, and the locking control device controls locking or loosening of the upper locking mechanism on the fixed Supporting rod;

the upper locking mechanism comprises an upper connection frame, a locking plate, a swing bolt and an eccentric rod, the upper connection frame is provided with a guiding and positioning hole for the fixed supporting rod to pass through, the upper connection frame is installed on the fixed supporting rod in a sleeving manner through the guiding and positioning hole, a locking plate installing groove is formed in the upper connection frame, the locking plate groove communicates with the guiding and positioning hole at a position of a groove edge, the locking plate is installed in the locking plate groove, the locking plate is provided with arc-shaped surfaces to be used for clamping the fixed supporting rod, a side face of the locking plate is connected with one end of the swing bolt, the other end of the swing bolt is installed on the eccentric rod in a sleeving manner, and movement of the eccentric rod is transmitted through the locking control device;

the locking control device comprises a pulling handle and a pulling handle core, a core body base, swinging shafts and eccentric boss shafts are arranged on the pulling handle core, the swinging shafts are arranged on two sides of the core body base, a front side of the upper connection frame is provided with a corresponding core body installing groove and swinging shaft through grooves, the swinging shaft is installed in the swinging shaft through groove, the pulling handle core is installed in the core body installing groove, the pulling handle driving the core body base to rotate is installed on a front side of the core body base, the core body base is provided with four screw holes to be connected and locked to the pulling handle through screws, the core body base rotates around a shaft axis of the swinging shaft, the swinging shaft of the pulling handle core is provided with an eccentric rod groove, the eccentric rod is installed in the eccentric rod groove, an axis of the eccentric rod deviates from an axis of the swinging shaft, and eccentric rotation of the eccentric rod enables the swing bolt to do push-pull movement;

the locking control device can control locking or loosening of the lower locking mechanism on the second sliding part, the eccentric boss shafts are arranged on two sides of the swinging shaft of the pulling handle core, an axis of the eccentric boss shaft deviates from that of the swinging shaft of the pulling handle core, the eccentric boss shaft is connected with the lower locking mechanism, the eccentric boss shaft is driven by eccentric swinging of the swinging shaft, so that the locking mechanism carries out locking or loosening on the second sliding part, the lower locking mechanism comprises outer side pipes, a connection rod, an upper pulling block, a tightening rod, a tightening wedge block, a locking block and a lower connection frame, an upper end of the outer side pipe is connected with the upper connection frame, a bottom end of the outer side pipe penetrates through the sliding frame to be connected with the lower connection frame, the connection rod is installed in the outer side pipe on one side, an upper end of the connection rod is connected with the swinging eccentric boss shaft in a hinged manner, the connection rod can be driven to achieve up-down displacement due to reciprocating swinging of the eccentric boss shaft, a lower end of the connection rod is connected with the upper pulling block in a hinged manner, the upper pulling block is in threaded connection with an upper end of the tightening rod, a bottom end of the tightening rod penetrates through the sliding frame to be provided with the tightening wedge block, the connection rod can drive the tightening wedge block to move up and down, the lower connection frame is provided with a groove, the tightening wedge block is located in the groove of the lower connection frame, the locking block is placed on one side of the tightening wedge block, relative to the tightening wedge block, the locking block is located at a position, close to a middle of the lower connection frame, in the groove, one surface, making contact with the locking block, of the tightening wedge block is a bevel, one surface, making contact with the tightening wedge block, of the locking block is also a bevel, a height of the groove is equal to that of the locking block, the bevel of the tightening wedge block in the upward moving process can push the locking block to move transversely in the groove, and the locking block moves transversely so as to lock the second sliding part;

the second sliding part comprises a guiding and positioning block, a middle pipe and supporting feet, the guiding and positioning block is installed between the two outer side pipes, and has a guiding and positioning effect relative to sliding of the middle pipe, a lower surface of the guiding and positioning block is provided with the middle pipe, the middle pipe sequentially penetrates through the sliding frame and the lower connection frame to be connected with the supporting feet, a portion, penetrating through the lower connection frame, of the middle pipe is located in the groove of the lower connection frame, and can be locked or loosened by the locking block, and therefore the second sliding part is controlled to achieve a static or sliding state;

the fixed part is provided with a magnetic latch device, the magnetic latch device comprises a first sliding frame, a second sliding frame, a third sliding frame, magnetic blocks and protective covers, the first sliding frame is provided with a first positioning and guiding hole and a second positioning and guiding hole, the two fixed supporting rods are respectively located in the first positioning and guiding hole and the second positioning and guiding hole, every two of the first sliding frame, the second sliding frame and the third sliding frame are in butt joint due to attracting of the magnetic blocks, butt joint surfaces of the first sliding frame and the second sliding frame are provided with grooves, the magnetic block is installed in the groove, a bottom surface of the groove is provided with an opening for the magnetic block to be inserted and installed, a bottom surface of the magnetic block is provided with the protective cover, the protective cover is installed at a position of the opening, two opposite side surfaces of the magnetic block are respectively provided with a first sliding groove and a second sliding groove, attracting portions and clamping strip portions of the magnetic block are on both sides of the first sliding groove and the second sliding groove, an inner side wall of the groove is provided with a sliding strip corresponding to the first sliding groove, the sliding strip is arranged in the first sliding groove, the other inner side wall of the groove is provided with a guiding strip, the guiding strip comprises a guiding portion and an inwards-concaved portion, the guiding portion is located in front of the inwards-concaved portion, and the guiding portion is arranged in the second sliding groove;

the sliding frames are completely the same in structure, butt joint surfaces of the sliding frames are also provided with grooves used for installing the magnetic blocks, and an installing manner and a position of the magnetic block in the groove in the butt joint surface of each sliding frame are completely the same as those of a structure of the first sliding frame.

2. The single-hand-lever double-joint-control adjustable hoop type bearing frame according to claim 1, which is characterized in that, the pulling handle comprises a connection portion and a handheld portion, the connection portion is trapezoidal, a front side of the handheld portion is rectangular, a cross section of the handheld portion is in an arch shape, the handheld portion is provided with a handheld through groove, one side of the handheld through groove is provided with a first side through hole, the other side of the handheld through groove is provided with a second side through hole, a first upper through hole and a second upper through hole are formed above the handheld through groove, the first side through hole and the second side through hole are symmetrically formed, and the first upper through hole and the second upper through hole are symmetrically formed; the handheld through groove is trapezoidal, the first side through hole and the second side through hole are triangular, and the first upper through hole and the second upper through hole are in a water drop shape.

3. The single-hand-lever double-joint-control adjustable hoop type bearing frame according to claim 1, which is characterized in that, a lower bottom surface of the first sliding frame is provided with a placement hole, an adjusting wrench is arranged in the placement hole, the adjusting wrench comprises an upper locking block adjusting wrench and a lower locking block adjusting wrench, the upper locking block adjusting wrench comprises a handheld portion and a limiting portion, the limiting portion comprises four petal-shaped bodies and an overall outer surface is cylindrical, a top end of each petal-shaped body is provided with a limiting convex block and an overall outer surface is conical, and the petal-shaped body is located in the placement hole, an opening extending groove is formed above the limiting portion, the limiting convex block is located in the opening extending groove, a bottom of the handheld portion is provided with a hexagon wrench, an anti-falling rubber sheet is arranged in the hexagon wrench, a middle of the anti-falling rubber sheet is provided with a wrench positioning hole, the handheld portion and the limiting portion are each internally provided with a through hole, the lower locking block adjusting wrench comprises a hand lever portion and an adjusting column, the hand lever portion is fixed to a bottom end of the adjusting column, the adjusting column sequentially penetrates through the wrench positioning hole and the through hole, during installing, the limiting portion is firstly placed in the placement hole, the four petal-shaped bodies are closed, the limiting convex block on a top is enabled to pass through the placement hole at the same time, then the adjusting wrench penetrates into the through hole so that the four pedal-shaped bodies can open, and meanwhile the limiting convex block on the top is enabled to be fixed in the opening extending groove.

4. The single-hand-lever double-joint-control adjustable hoop type bearing frame according to claim 1, which is characterized in that, an inner side of the lower connection frame is provided with an installing hole, a stopping block is arranged in the installing hole, the stopping block and the lower connection frame are fixedly installed through a self-tapping screw, the stopping block is used for dust prevention and attractiveness, and a structure is more steady.

* * * * *